(12) United States Patent
Kaji et al.

(10) Patent No.: US 12,384,172 B2
(45) Date of Patent: Aug. 12, 2025

(54) INK JET RECORDING METHOD AND INK JET RECORDING APPARATUS

(71) Applicant: CANON KABUSHIKI KAISHA, Tokyo (JP)

(72) Inventors: Mamiko Kaji, Kanagawa (JP); Akira Kuriyama, Kanagawa (JP); Yoshihide Aikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 18/471,877

(22) Filed: Sep. 21, 2023

(65) Prior Publication Data

US 2024/0100864 A1 Mar. 28, 2024

(30) Foreign Application Priority Data

Sep. 22, 2022 (JP) .................. 2022-151697
Sep. 22, 2022 (JP) .................. 2022-151698
Sep. 22, 2022 (JP) .................. 2022-151699
Sep. 1, 2023 (JP) .................. 2023-142106

(51) Int. Cl.
| | |
|---|---|
| B41J 11/00 | (2006.01) |
| B41M 7/00 | (2006.01) |
| C09D 11/033 | (2014.01) |
| C09D 11/107 | (2014.01) |
| C09D 11/30 | (2014.01) |

(52) U.S. Cl.
CPC ........ *B41J 11/0022* (2021.01); *B41J 11/0024* (2021.01); *B41J 11/007* (2013.01); *B41J 11/0085* (2013.01); *B41M 7/009* (2013.01); *C09D 11/033* (2013.01); *C09D 11/107* (2013.01); *C09D 11/30* (2013.01)

(58) Field of Classification Search
CPC ... B41J 11/0022; B41J 11/0024; B41J 11/007; B41J 11/0085; B41M 7/009; C09D 11/033; C09D 11/107; C09D 11/30; C09D 11/322

See application file for complete search history.

(56) References Cited

U.S. PATENT DOCUMENTS

| | | |
|---|---|---|
| 7,285,159 B2 | 10/2007 | Aikawa et al. |
| 7,288,143 B2 | 10/2007 | Aikawa et al. |
| (Continued) | | |

FOREIGN PATENT DOCUMENTS

| | | |
|---|---|---|
| JP | 2006104244 A | 4/2006 |
| JP | 2011178547 A | 9/2011 |
| (Continued) | | |

*Primary Examiner* — Bradley W Thies
(74) *Attorney, Agent, or Firm* — Venable LLP

(57) ABSTRACT

Provided is an ink jet recording method by which even when a recording medium having a relatively small basis weight or a highly water-absorbing recording medium is used, an image can be recorded while the occurrence of cockling is suppressed. The method is an ink jet recording method including recording an image on a recording medium with an ink jet recording apparatus including a blowing portion configured to blow air to the recording medium to dry an aqueous ink. The blowing portion includes conveying members and a blowing device. The conveying members include a first conveying member free of an adsorption mechanism and a second conveying member including an adsorption mechanism in the stated order. The aqueous ink includes a water-soluble organic solvent.

16 Claims, 9 Drawing Sheets

(56) References Cited

U.S. PATENT DOCUMENTS

| | | |
|---|---|---|
| 7,294,184 B2 | 11/2007 | Fujimoto et al. |
| 7,374,606 B2 | 5/2008 | Sato et al. |
| 7,445,325 B2 | 11/2008 | Aikawa et al. |
| 7,557,150 B2 | 7/2009 | Teshima et al. |
| 7,615,113 B2 | 11/2009 | Aikawa et al. |
| 7,927,412 B2 | 4/2011 | Kuriyama et al. |
| 8,408,691 B2 | 4/2013 | Koike et al. |
| 8,727,525 B2 | 5/2014 | Houjou |
| 8,746,871 B2 | 6/2014 | Chiwata |
| 9,624,395 B2 | 4/2017 | Kaji et al. |
| 9,981,480 B2 | 5/2018 | Imai et al. |
| 10,280,326 B2 | 5/2019 | Saito et al. |
| 10,688,787 B2 | 6/2020 | Kaji et al. |
| 10,710,365 B2 | 7/2020 | Takebayashi et al. |
| 10,723,135 B2 | 7/2020 | Kawabe et al. |
| 10,843,482 B2 | 11/2020 | Aikawa et al. |
| 10,843,483 B2 | 11/2020 | Saito et al. |
| 10,864,747 B2 | 12/2020 | Nakagawa et al. |
| 10,864,748 B2 | 12/2020 | Imai et al. |
| 10,870,770 B2 | 12/2020 | Sakai et al. |
| 11,104,820 B2 | 8/2021 | Abe et al. |
| 2012/0087687 A1 * | 4/2012 | Moteki ............... G03G 15/657 399/68 |

FOREIGN PATENT DOCUMENTS

| | | |
|---|---|---|
| JP | 2012020548 A | 2/2012 |
| JP | 2012126057 A | 7/2012 |
| JP | 2012232498 A | 11/2012 |

\* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In an ink jet recording method including applying an aqueous ink to a recording medium by an ink jet system to record an image, so-called "cockling" in which moisture in the ink permeates the recording medium to swell and deform the recording medium may occur.

To suppress such cockling, for example, there has been proposed an ink jet recording method including a conveying step of conveying a recording medium with a conveying member having a plurality of adsorbing holes arranged so that their pitch intervals may widen from the central portion of the member toward an end portion thereof (Japanese Patent Application Laid-Open No. 2011-178547). In the ink jet recording method, the deformation of the recording medium is alleviated by adsorbing the central portion of the recording medium with a strong suction force to disperse the cockling toward an end portion thereof.

SUMMARY OF THE INVENTION

The inventors of the present invention have investigated the recording method proposed in Japanese Patent Application Laid-Open No. 2011-178547. As a result, the inventors have revealed that when a recording medium having a relatively small basis weight or a highly water-absorbing recording medium is used, the amount of water permeating the recording medium increases and hence the cockling is remarkably liable to occur.

Accordingly, an object of the present invention is to provide an ink jet recording method by which even when a recording medium having a relatively small basis weight or a highly water-absorbing recording medium is used, an image can be recorded while the occurrence of cockling is suppressed. In addition, another object of the present invention is to provide an ink jet recording apparatus to be used in the ink jet recording method.

That is, according to the present invention, there is provided an ink jet recording method including recording an image on a recording medium with an ink jet recording apparatus including: a recording portion configured to apply an aqueous ink ejected by an ink jet system to the recording medium; and a blowing portion configured to blow air to the recording medium having applied thereto the aqueous ink, while conveying the recording medium, to dry the aqueous ink, wherein the blowing portion includes conveying members configured to convey the recording medium and a blowing device configured to blow air to the recording medium, wherein the conveying members include a first conveying member, which is free of an adsorption mechanism configured to adsorb the recording medium, and a second conveying member, which includes an adsorption mechanism configured to adsorb the recording medium, in the stated order, wherein the aqueous ink includes a water-soluble organic solvent, and wherein the water-soluble organic solvent contains a water-soluble hydrocarbon compound having a hydrocarbon chain having 3 or more carbon atoms, the compound being substituted with 2 or more hydrophilic groups each selected from the group consisting of a hydroxy group; an amino group; and an anionic group, provided that the hydrocarbon chain may be interrupted by a sulfonyl group or an ether group and when the number of the carbon atoms of the hydrocarbon chain is 3 or 4, the hydrophilic groups include an anionic group or the hydrocarbon chain is interrupted by a sulfonyl group.

According to the present invention, there can be provided the ink jet recording method by which even when a recording medium having a relatively small basis weight or a highly water-absorbing recording medium is used, an image can be recorded while the occurrence of cockling is suppressed. In addition, according to the present invention, the ink jet recording apparatus to be used in the ink jet recording method can be provided.

Further features of the present invention will become apparent from the following description of exemplary embodiments with reference to the attached drawings.

DESCRIPTION OF THE EMBODIMENTS

Figure 1:
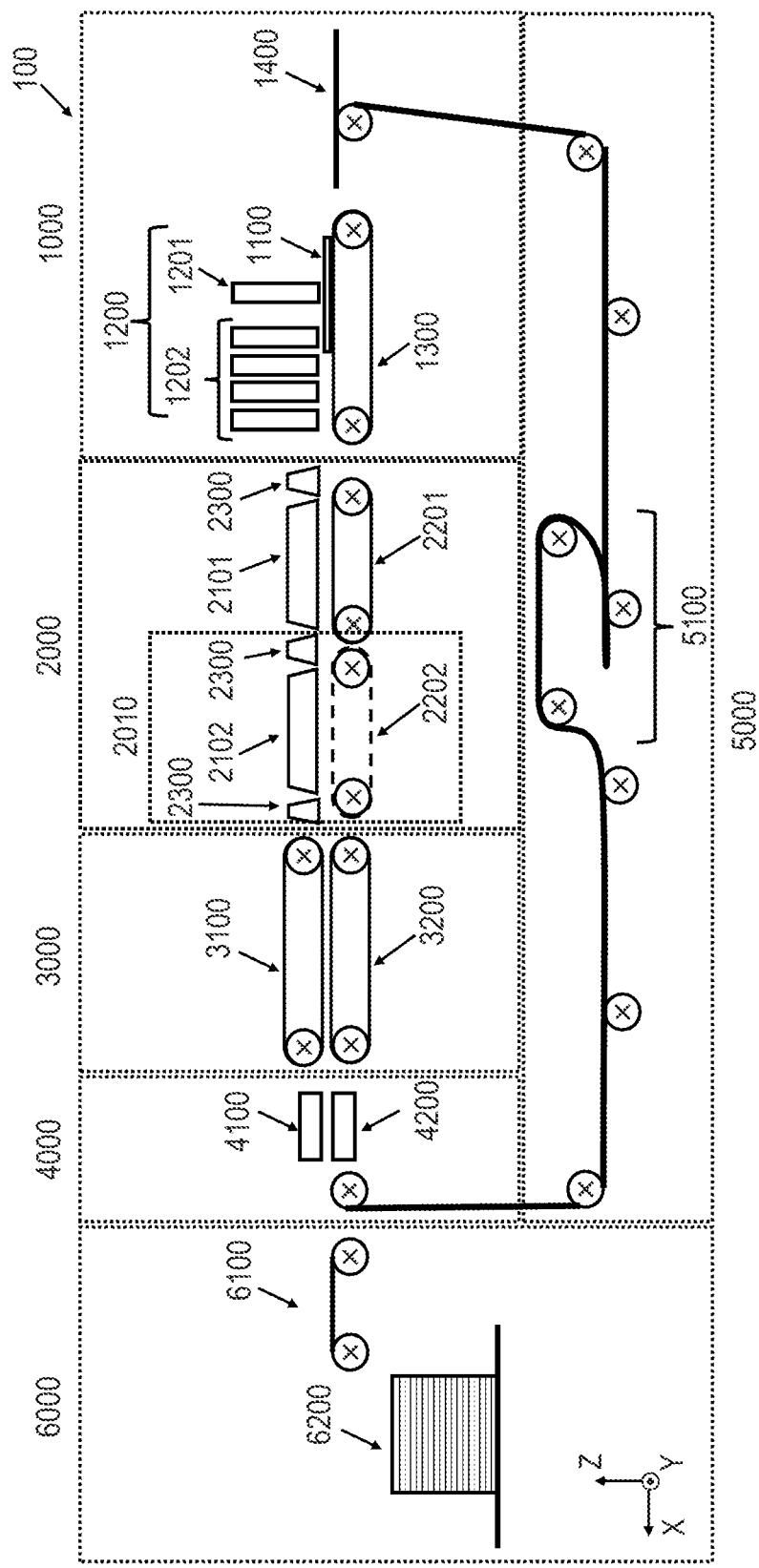
FIG. 1 is a schematic view for illustrating an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at room temperature (25° C.), unless otherwise stated. The descriptions "(meth)acrylic acid" and "(meth)acrylate" refer to "acrylic acid or methacrylic acid" and "acrylate or methacrylate", respectively.

When an ink is applied to a recording medium, components in the ink diffuse into the recording medium. Of the components that have diffused into the recording medium, each of components having hydrogen-bonding properties cleaves a hydrogen bond between the molecules of cellulose for forming the recording medium and forms a hydrogen bond with the cellulose. Of the components having hydrogen-bonding properties in the ink, a component that is incorporated in an overwhelmingly large amount is moisture. The cellulose for forming the recording medium forms a hydrogen bond with the moisture in the ink to swell, resulting in cockling. Then, the degree of the cockling becomes remarkable with time because the components in the ink diffuse into the recording medium to a larger extent with the lapse of time.

Because of a vapor pressure, the moisture in a recorded product is gradually released from the surface of the recording medium into the air immediately after the application of the ink. A reduction in amount of the moisture of the surface of the recording medium causes a concentration gradient. Accordingly, the moisture in the recording medium gradually moves to the surface to cleave the hydrogen bond between the moisture and the cellulose. The molecules of the cellulose whose hydrogen bonds with the moisture have been cleaved form a hydrogen bond therebetween again. However, even when the molecules of the cellulose that have already been affected by the moisture or the like form a hydrogen bond therebetween, it is difficult for the molecules of the cellulose to maintain its shape before the application of the ink and hence the cockling occurs here again.

The cockling that occurs via such mechanism as described above becomes remarkable when a recording medium having a relatively small basis weight or a highly water-absorbing recording medium into which the components in the ink are liable to diffuse is used. For example, a method including shortening a time period from the application of the ink to the drying thereof to the extent possible to quickly remove the moisture in the recording medium is available as a method of suppressing the cockling. The inventors of the present invention have fixed the recording medium with an adsorption mechanism that adsorbs the recording medium from its rear surface side and have recognized a situation in which the cockling occurs by blowing air to the recording medium under the state to dry the ink. As a result, the inventors have revealed that even such method exhibits an insufficient cockling-suppressing effect. It is conceivable that the cockling could not be suppressed because the moisture vaporized by the air blowing was sucked into the recording medium together with air by the suction of the recording medium from the rear surface and hence a larger amount of the moisture moved into the recording medium.

Under such circumstances, the inventors of the present invention have further investigated a method including blowing air to the ink applied to the recording medium to dry the ink. As a result, the inventors have found that when the following requirements (i) to (iii) are satisfied, even in the case where a recording medium having a relatively small basis weight or a highly water-absorbing recording medium is used, the occurrence of the cockling can be effectively suppressed and thus the inventors have reached the present invention:

(i) a blowing portion includes conveying members configured to convey the recording medium having applied thereto the ink and a blowing device configured to blow air to the recording medium;

(ii) the conveying members include a first conveying member, which is free of an adsorption mechanism configured to adsorb the recording medium, and a second conveying member, which includes an adsorption mechanism configured to adsorb the recording medium, in the stated order; and (iii) an ink including a water-soluble organic solvent containing a specific water-soluble hydrocarbon compound is used.

A large amount of moisture is present in the ink immediately after its application to the recording medium (at the early stage of its drying). The movement of the moisture into the recording medium having applied thereto the ink can be suppressed by blowing air to the recording medium while conveying the recording medium with the first conveying member free of an adsorption mechanism. In addition, at the later stage of the drying, the moisture in the ink is removed to some extent. Accordingly, even when the recording medium is conveyed while being sucked from its rear surface by the second conveying member, the moisture does not move into the recording medium to a very large extent. Further, when the recording medium is conveyed by the second conveying member including the adsorption mechanism, even in the case where the moisture has moved into the recording medium, the shape of the recording medium including cellulose can be physically maintained. Probably as a result of the foregoing, the occurrence of the cockling can be suppressed.

When the first conveying member includes an adsorption mechanism or when a conveying portion is free of the first conveying member, as described above, the moisture vaporized by the air blowing is sucked into the recording medium together with air by the suction of the recording medium from its rear surface. Thus, a larger amount of the moisture moves into the recording medium and hence the occurrence of the cockling cannot be suppressed. When the second conveying member is free of an adsorption mechanism or when the conveying portion is free of the second conveying member, it becomes difficult to physically maintain the shape of the recording medium including the cellulose owing to the influence of the moisture that has moved into the recording medium with the lapse of time. Accordingly, the occurrence of the cockling cannot be suppressed.

The recording medium generally includes the cellulose and the moisture in the ink forms a hydrogen bond with the cellulose. When the ink including the water-soluble organic solvent containing the specific water-soluble hydrocarbon compound is used, even in the case where the moisture in the ink applied to the recording medium evaporates or moves in the recording medium, the hydrocarbon compound and the cellulose form a hydrogen bond therebetween. Probably as a result of the foregoing, the shape of the recording medium including the cellulose before the application of the ink is maintained to enable the suppression of the occurrence of the cockling. When the ink does not include the specific water-soluble organic solvent, even in the case where the above-mentioned blowing portion is present, at the time of the movement of the moisture into the recording medium, the shape of the recording medium including the cellulose cannot be physically maintained and hence the occurrence of the cockling cannot be suppressed.

<Ink Jet Recording Method and Ink Jet Recording Apparatus>

An ink jet recording method (hereinafter also simply referred to as "recording method") of the present invention is an ink jet recording method including recording an image on a recording medium with an ink jet recording apparatus including a recording portion and a blowing portion. The recording portion is a portion configured to apply an aqueous ink ejected by an ink jet system to the recording medium. The blowing portion is a portion configured to blow air to the recording medium having applied thereto the aqueous ink, while conveying the recording medium, to dry the aqueous ink. The blowing portion includes conveying members configured to convey the recording medium and a blowing device configured to blow air to the recording medium. The conveying members include a first conveying member, which is free of an adsorption mechanism configured to adsorb the recording medium, and a second conveying member, which includes an adsorption mechanism configured to adsorb the recording medium, in the stated order.

The aqueous ink includes a water-soluble organic solvent. In addition, the water-soluble organic solvent contains a water-soluble hydrocarbon compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

An ink jet recording apparatus (hereinafter also simply referred to as "recording apparatus") of the present invention is an ink jet recording apparatus including a recording portion and a blowing portion. The recording portion is a portion configured to apply an aqueous ink ejected by an ink jet system to a recording medium. The blowing portion is a portion configured to blow air to the recording medium having applied thereto the aqueous ink, while conveying the recording medium, to dry the aqueous ink. The blowing portion includes conveying members configured to convey the recording medium and a blowing device configured to blow air to the recording medium. The conveying members include a first conveying member, which is free of an adsorption mechanism configured to adsorb the recording medium, and a second conveying member, which includes an adsorption mechanism configured to adsorb the recording medium, in the stated order. The aqueous ink includes a water-soluble organic solvent. In addition, the water-soluble organic solvent contains a water-soluble hydrocarbon compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

(Ink Jet Recording Apparatus)

Details about the ink jet recording apparatus are described below with reference to the drawings. FIG. 1 is a schematic view for illustrating the ink jet recording apparatus according to one embodiment of the present invention. The ink jet recording apparatus of this embodiment is an ink jet recording apparatus that records an image on a recording medium with a reaction liquid containing a reactant that reacts with an ink and the ink. An X-direction, a Y-direction and a Z-direction represent the width direction (total length direction), depth direction and height direction of the ink jet recording apparatus, respectively. The recording medium is conveyed in the X-direction.

An ink jet recording apparatus 100 of the embodiment illustrated in FIG. 1 includes: a recording portion 1000; a blowing portion 2000; a fixing portion 3000; a cooling portion 4000; a reversing portion 5000; and a sheet delivery portion 6000. In the recording portion 1000, various liquids are applied to a recording medium 1100, which has been conveyed from a sheet feeding device 1400 by a conveying member 1300, by a liquid applying device 1200. In the blowing portion 2000, air is blown from each of a first blowing device 2101 and a second blowing device 2102 to the liquids applied to the recording medium 1100 to evaporate volatile components in the liquids such as moisture, to thereby dry the liquids. In the fixing portion 3000, a fixing member 3100 is brought into contact with the region of the recording medium 1100 having applied thereto the liquids to heat the region, to thereby accelerate the fixation of an image to the recording medium 1100. After that, the recording medium 1100 is cooled by the cooling member 4100 of the cooling portion 4000. When an image is to be recorded on the rear surface of the recording medium subsequently to the front surface (recording surface) thereof, first, the recording medium 1100 is reversed by the reversing device 5100 of the reversing portion 5000. Next, after the image has been recorded on the rear surface as in the case of the front surface, the recording medium is conveyed by the conveying member 6100 of the sheet delivery portion 6000 and is loaded and stored in a recording medium storage portion 6200.

For example, such recording media each having ink absorbability (permeability) as described below may each be used as the recording medium 1100: a recording medium free of a coating layer, such as plain paper or uncoated paper; and a recording medium including a coating layer, such as glossy paper or art paper. Those recording media are recording media each containing cellulose. Even in each of the above-mentioned recording media that are liable to undergo deformation (cockling), the adoption of the configuration of the present invention can suppress the deformation of the recording medium. In addition, the basis weight ($g/m^2$) of the recording medium 1100 is preferably 30 $g/m^2$ or more, more preferably 50 $g/m^2$ or more. When the basis weight is less than 30 $g/m^2$, the air permeability of the recording medium is high. Thus, the recording medium is soft and is hence extremely liable to bend. Accordingly, the occurrence of the cockling of the recording medium cannot be sufficiently suppressed in some cases. The basis weight ($g/m^2$) of the recording medium 1100 is preferably 120 $g/m^2$ or less. In other words, even in a recording medium having a relatively low basis weight, the adoption of the configuration of the present invention can sufficiently suppress the occurrence of the cockling. In contrast, it is conceivable that when the basis weight of the recording medium 1100 is sufficiently large, the cockling does not become a problem in the first place or no cockling problem occurs.

[Recording Portion]

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquid-absorbing characteristics, the reaction liquid is preferably applied before the application of the ink. An ejection head (recording head) of an ink jet system is used as the ink applying device 1202. Examples of the ejection system of the ejection head serving as the liquid applying device 1200 may include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface 1207 (FIG. 3) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
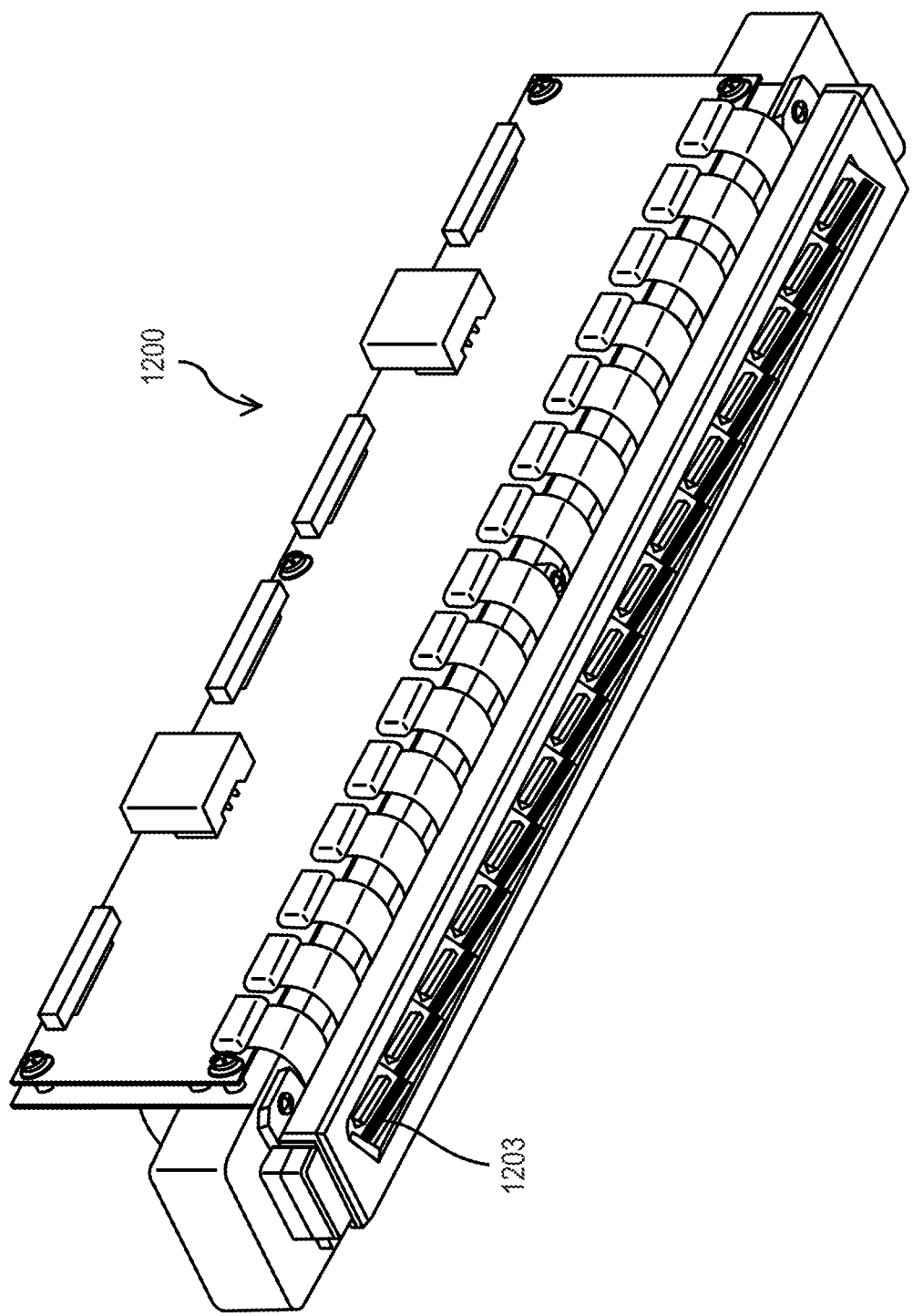
FIG. 2 is a perspective view for illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

Figure 3:
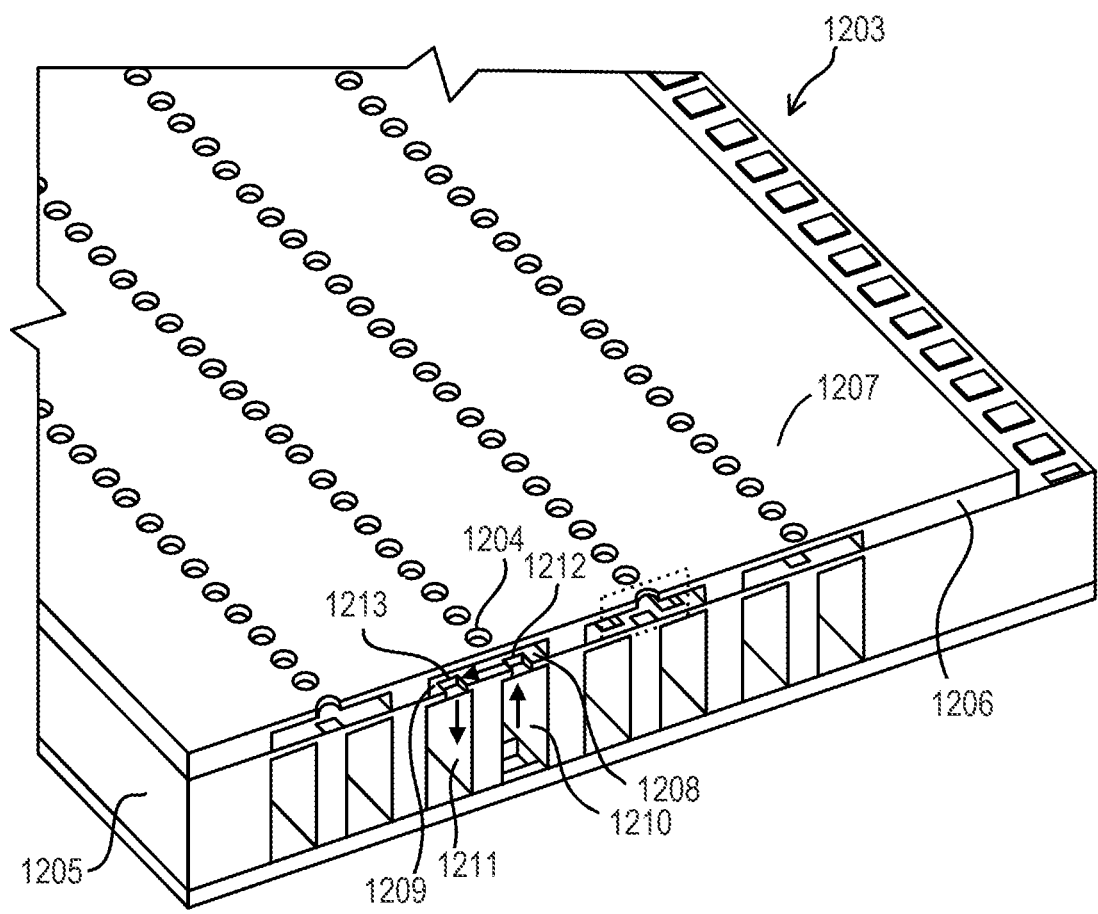
FIG. 3 is a sectional perspective view for illustrating an example of an ejection element substrate.
Figure 4:
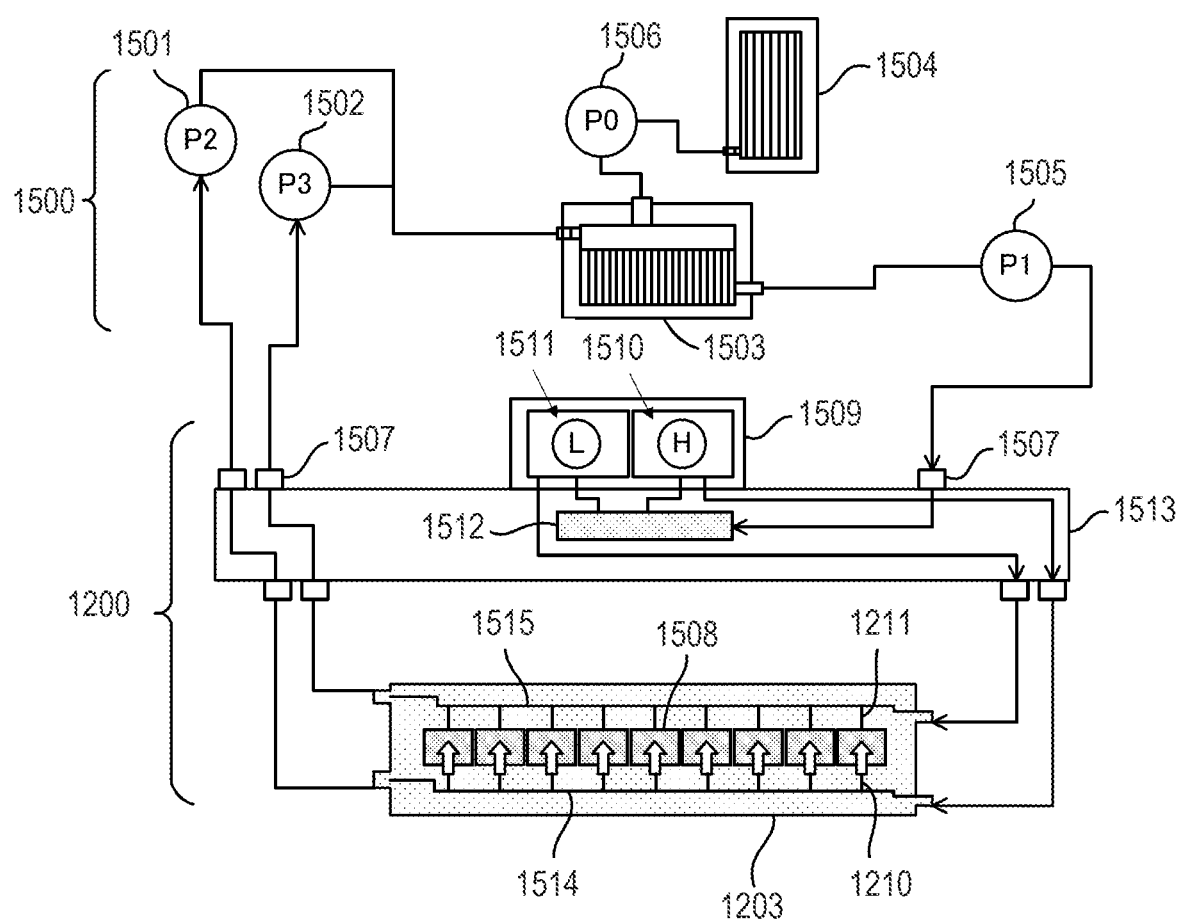
FIG. 4 is a schematic view for illustrating an example of a liquid supply system.

FIG. 3 is a sectional perspective view for illustrating an example of each of the ejection element substrates. The ejection element substrate 1203 illustrated in FIG. 3 includes: an ejection orifice forming member 1206 having opened therein ejection orifices 1204; and a substrate 1205 having arranged thereon an ejection element (not shown). The lamination of the ejection orifice forming member 1206 and the substrate 1205 forms a first flow path 1208 and a second flow path 1209 through which a liquid flows. The first flow path 1208 is a region from an inflow port 1212, into which the liquid flows from an inflow path 1210, to a portion between each of the ejection orifices 1204 and the ejection element (FIG. 4, a liquid chamber 1508). In addition, the second flow path 1209 is a region from the portion between the ejection orifice 1204 and the ejection element (FIG. 4, the liquid chamber 1508) to an outflow port 1213 from which the liquid flows out to an outflow path 1211. For example, when a pressure difference is made between the inflow port 1212 and the outflow port 1213 like the inflow port 1212 having a high pressure and the outflow port 1213 having a low pressure, the liquid can be flowed from the high pressure to the low pressure (in a direction indicated by the arrows in FIG. 3). The liquid that has passed the inflow path 1210 and the inflow port 1212 enters the first flow path 1208. Then, the liquid that has gone through the portion between the ejection orifice 1204 and the ejection element (FIG. 4, the liquid chamber 1508) flows to the outflow path 1211 via the second flow path 1209 and the outflow port 1213.

[Supply System]

FIG. 4 is a schematic view for illustrating an example of a supply system for the liquids such as the ink. A supply portion 1500 of the liquid applying device 1200 illustrated in FIG. 4 includes: a first circulation pump (high-pressure side) 1501; a first circulation pump (low-pressure side) 1502; a sub tank 1503; and a second circulation pump 1505. The sub tank 1503 connected to a main tank 1504 serving as a liquid storage portion has an air communication port (not shown) and hence can discharge air bubbles mixed into a liquid to the outside of a circulation system. The sub tank 1503 is also connected to a replenishment pump 1506. A liquid is consumed in the liquid applying device 1200 by the ejection (discharge) of the liquid from an ejection orifice in, for example, image recording or suction recovery. The replenishment pump 1506 transfers the liquid corresponding to the consumed amount from the main tank 1504 to the sub tank 1503.

The first circulation pump (high-pressure side) 1501 and the first circulation pump (low-pressure side) 1502 each flow the liquid in the liquid applying device 1200 that has been flowed out of a connection portion (inflow portion) 1507 to the sub tank 1503. A positive-displacement pump having a quantitative liquid-delivering ability is preferably used as each of the first circulation pump (high-pressure side) 1501, the first circulation pump (low-pressure side) 1502 and the second circulation pump 1505. Examples of such positive-displacement pump may include a tube pump, a gear pump, a diaphragm pump and a syringe pump. At the time of the driving of each of the ejection element substrates 1203, the liquid can be flowed from a common inflow path 1514 to a common outflow path 1515 by the first circulation pump (high-pressure side) 1501 and the first circulation pump (low-pressure side) 1502.

A negative pressure control unit 1509 includes two pressure adjusting mechanisms in which control pressures different from each other are set. A pressure adjusting mechanism (high-pressure side) 1510 and a pressure adjusting mechanism (low-pressure side) 1511 are connected to the common inflow path 1514 and the common outflow path 1515 in the ejection element substrate 1203 via a supply unit 1513 having arranged therein a filter 1512 that removes foreign matter from a liquid, respectively. The ejection element substrate 1203 has arranged therein the common inflow path 1514, the common outflow path 1515, and the inflow path 1210 and the outflow path 1211 that communicate to the liquid chamber 1508 serving as a portion between each of the ejection orifices 1204 and the ejection element (not shown). The inflow path 1210 and the outflow path 1211 communicate to the common inflow path 1514 and the common outflow path 1515, respectively. Accordingly, a flow (arrow in FIG. 4) in which part of the liquid passes the inside of the liquid chamber 1508 from the common inflow path 1514 to flow to the common outflow path 1515 occurs. The arrows in FIG. 3 indicate the flow of the liquid in the liquid chamber 1508. That is, as illustrated in FIG. 3, the liquid in the first flow path 1208 flows to the second flow path 1209 via a space between the ejection orifice 1204 and the ejection element.

As illustrated in FIG. 4, the pressure adjusting mechanism (high-pressure side) 1510 is connected to the common inflow path 1514 and the pressure adjusting mechanism (low-pressure side) 1511 is connected to the common outflow path 1515. Accordingly, a pressure difference occurs between the inflow path 1210 and the outflow path 1211. Thus, a pressure difference also occurs between the inflow port 1212 (FIG. 3) communicating to the inflow path 1210 and the outflow port 1213 (FIG. 3) communicating to the outflow path 1211. When a liquid is flowed by the pressure difference between the inflow port 1212 and the outflow port 1213, the flow rate (mm/s) of the liquid is preferably controlled to 0.1 mm/s or more to 10.0 mm/s or less.

[Conveyance System]

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200.

The respective liquid applying devices receive the image signal of recorded data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the recording medium; and an approach including forming the conveying member 1300 from an appropriate material and electrostatically adsorbing the recording medium 1100 to fix the recording medium.

[Blowing Portion]

As illustrated in FIG. 1, the blowing portion 2000 includes: the first blowing device 2101 and the second blowing device 2102; and a first conveying member 2201 and a second conveying member 2202 arranged to face the first blowing device 2101 and the second blowing device 2102, respectively. That is, the conveying members for forming the blowing portion 2000 include the first conveying member 2201 and the second conveying member 2202 in the stated order. While the recording medium 1100 having applied thereto the reaction liquid and the ink is conveyed by the first conveying member 2201 and the second conveying member 2202, air (airflow) blown from each of the first blowing device 2101 and the second blowing device 2102 is applied to the recording medium to evaporate volatile components such moisture, to thereby dry the reaction liquid and the ink. Thus, the occurrence of the deformation (cockling) of the recording medium 1100 can be effectively suppressed.

When the air blown from each of the first blowing device 2101 and the second blowing device 2102 is applied to the recording medium 1100, drying efficiency is easily improved and the recording medium 1100 can be pressed down on the first conveying member 2201 and the second conveying member 2202. The blowing mechanism of each of the first blowing device 2101 and the second blowing device 2102 may have any configuration as long as the mechanism can blow air. For example, a mechanism, such as a fan or a blower, only needs to be built in each of the blowing devices.

To further improve the drying efficiency, a heating unit such as a heating device that heats the recording medium 1100 is preferably used in combination with the blowing devices. The heating unit may have any configuration as long as the unit can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

The recording medium 1100 may be heated from the side of the surface (recording surface (front surface)) having applied thereto the reaction liquid and the ink, may be heated from its rear surface side or may be heated from both the surfaces. A heating function may be imparted to each of the first conveying member 2201 and the second conveying member 2202. Although the first conveying member 2201 and the second conveying member 2202 each utilizing a conveying belt are illustrated in FIG. 1, for example, a spur or a conveying cylinder may be utilized as long as the spur or the cylinder has a function of conveying the recording medium 1100.

A heating temperature is preferably set so that a liquid component may be quickly evaporated and so that the recording medium 1100 may not be overdried from the viewpoint of suppressing the deformation of the recording medium 1100. In view of a conveying speed and an environmental temperature, the temperature of a blowing unit (e.g., warm air) may be set so that the recording medium may have a desired temperature. Specifically, the temperature of the blowing unit (e.g., warm air) is set to preferably 25° C. or more to 100° C. or less, more preferably 60° C. or more to 80° C. or less. In addition, when a heated gas is blown to heat the recording medium 1100, an air speed is preferably set to 1 m/s or more to 100 m/s or less. The temperature of air such as warm air may be measured with a K-type thermocouple thermometer. A measuring machine may be specifically, for example, a machine available under the product name "AD-5605H" (manufactured by A&D Company, Limited). The temperatures and air speeds of the airs (warm airs) blown from the first blowing device 2101 and the second blowing device 2102 may be identical to or different from each other. The recording medium 1100 may be heated from the rear surfaces of the first conveying member 2201 and the second conveying member 2202 as required.

An adsorption mechanism that sucks and fixes the recording medium 1100 is not arranged in the first conveying member 2201. In addition, the air is blown from first blowing device 2101 to press the recording medium 1100 against the first conveying member 2201, to thereby convey the recording medium 1100. Thus, the recording medium 1100 can be delivered from the conveying member 1300 to the first conveying member 2201 and from the first conveying member 2201 to the second conveying member 2202 with high accuracy.

When an adsorption mechanism that sucks and fixes the recording medium 1100 is arranged in the first conveying member 2201, in the case where the application amount of the ink is large or in the case where a recording medium having a small basis weight is used, the moisture in the ink moves into the recording medium 1100 and hence the occurrence of the cockling cannot be suppressed. However, a case in which the first conveying member 2201 includes a slight suction mechanism for efficiently conveying the recording medium 1100 is not excluded. Meanwhile, an adsorption mechanism that sucks and fixes the recording medium 1100 is arranged in the second conveying member 2202. Thus, after the moisture in the ink applied to the recording medium 1100 has been moderately removed by the air blown from the first blowing device 2101, the air can be blown to the front surface (recording surface) of the recording medium 1100 delivered to the second conveying member 2202 while the recording medium is sucked from its rear surface. Accordingly, the occurrence of the cockling can be suppressed while the movement of water into the recording medium 1100 is suppressed. A conveying belt having arranged therein holes that can pass a gas therethrough is utilized as the second conveying member 2202 and the recording medium 1100 is conveyed while being fixed to the second conveying member 2202 via the suction mechanism (not shown).

Figure 8:
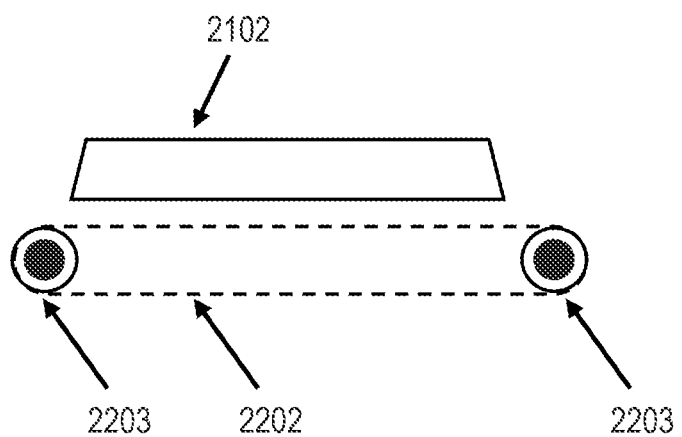
FIG. 8 is a schematic view for illustrating still another example of a first heating unit.

A first heating unit 2010 is preferably as follows: the recording surface of the recording medium is subjected to non-contact heating by the air blown from the second blowing device 2102; and the second conveying member, which has been heated, is caused to adsorb the rear surface of the recording medium through suction to subject the recording medium to contact heating. In other words, the second conveying member 2202 is preferably a member, which includes an adsorption mechanism that sucks and fixes the recording medium 1100 and which subjects the rear surface of the recording medium 1100 (surface opposite to the surface (recording surface) having applied thereto the reaction liquid and the ink) to contact heating. A unit for heating the second conveying member 2202 itself may have any configuration. A unit for subjecting the second conveying member 2202 to non-contact heating with the second blowing device 2102 when the recording medium 1100 is not conveyed is illustrated in FIG. 1. Further, the second conveying member 2202 may be subjected to non-contact heating with the above-mentioned infrared heater (not shown). A unit for subjecting the second conveying member 2202 to contact heating with heating members 2203 arranged in driving rollers is illustrated in FIG. 8. A heat source such as a halogen heater may be used as each of the heating members 2203. Of course, the conveying member may be further heated by separately arranging a heat source such as an infrared heater. From the viewpoints of apparatus downsizing and a cost reduction, as illustrated in FIG. 1, the second conveying member 2202 is preferably heated with the device (second blowing device 2102) that subjects the recording surface of the recording medium 1100 to non-contact heating. In other words, the unit for heating the second conveying member 2202 is preferably the device (second blowing device 2102) that subjects the recording surface of the recording medium 1100 to non-contact heating.

The heating temperature of the recording medium 1100 is preferably set so that the temperature of the rear surface of the recording medium 1100 heated by the first heating unit 2010 may be higher than the temperature of the recording surface of the recording medium 1100 heated by the first heating unit 2010. The heating of the recording medium as described above can cause a temperature gradient to move the moisture from the rear surface side of the recording medium to the recording surface side thereof. In addition, when the moisture that has moved to the recording surface side is subjected to non-contact heating to be quickly removed, the occurrence of the cockling can be further suppressed. In addition, the heating temperature is preferably set so that the recording medium 1100 may not be overdried from the viewpoint of suppressing the deformation of the recording medium 1100. In view of a conveying speed and an environmental temperature, the temperature of the first heating unit may be set so that the recording medium may have a desired temperature. Specifically, each of the recording surface and rear surface of the recording medium is preferably heated to 40° C. or more to 100° C. or less and is more preferably heated to 40° C. or more to less than 100° C. The surfaces are each particularly preferably heated to 60° C. or more to 80° C. or less in such ranges. The temperatures of the recording surface and rear surface of the recording medium may each be measured with a radiation thermometer. The radiation thermometer may be specifically, for example, a thermometer available under the product name "RADIATION THERMOMETER IT-545S" (manufactured by Horiba, Ltd.).

A time period required for the recording medium to pass the blowing portion may be appropriately selected in consideration of, for example, the quality of an image to be recorded, the kind of the recording medium and productivity. Specifically, the time period required for the recording medium to pass the blowing portion is set to preferably 0.25 second or more to 5.0 seconds or less, more preferably 0.5 second or more to 4.0 seconds or less, particularly preferably 1.0 second or more to 3.0 seconds or less. When the time period required for the passing is less than 0.25 second, the drying of the recording medium may not be sufficiently performed and hence the occurrence of the cockling cannot be sufficiently suppressed in some cases. In addition, the ink may be liable to adhere to the fixing portion. Meanwhile, when the time period required for the passing is more than 5.0 seconds, the distribution of the water in the recording medium may be nonuniform owing to its overdrying and hence the occurrence of the cockling cannot be sufficiently suppressed in some cases. Herein, the time period required to pass the blowing portion is a time period from the time point at which the recording medium starts to be conveyed on the first conveying member 2201 to the time point at which the recording medium starts to be conveyed on a conveying member 3200.

A time period ($T_1$ (sec)) required for the recording medium 1100 to pass the top of the first conveying member 2201 and a time period ($T_2$ (sec)) required for the recording medium 1100 to pass the top of the second conveying member 2202 preferably satisfy relationships represented by the following formulae (1) to (3).

$$T_1 > 0 \tag{1}$$

$$T_2 > 0 \tag{2}$$

$$1.0 < T_2/T_1 \tag{3}$$

When the value of the ratio $T_2/T_1$ is 1.0 or less, the $T_1$ becomes relatively long as compared to the $T_2$. Accordingly, the diffusion and permeation of the moisture into the recording medium 1100 are liable to advance and hence the recording medium is liable to deform in some cases. The second conveying member 2202 includes the mechanism for adsorbing the recording medium 1100 and hence it becomes difficult to maintain the shape of the recording medium 1100 before the application of the liquids. Accordingly, the occurrence of the cockling cannot be sufficiently suppressed in some cases. Herein, the $T_1$ is a time period from the time point at which the recording medium starts to be conveyed on the first conveying member 2201 to the time point at which the recording medium starts to be conveyed on the second conveying member 2202 and the $T_2$ is a time period from the time point at which the recording medium starts to be conveyed on the second conveying member 2202 to the time point at which the recording medium starts to be conveyed on the conveying member 3200.

Further, the time period ($T_1$ (sec)) required for the recording medium 1100 to pass the top of the first conveying member 2201 and the time period ($T_2$ (sec)) required for the recording medium 1100 to pass the top of the second conveying member 2202 preferably satisfy a relationship represented by the following formula (4).

$$1.0 < T_2/T_1 < 2.0 \tag{4}$$

When the value of the ratio $T_2/T_1$ is 2.0 or more, the $T_1$ becomes relatively short as compared to the $T_2$ and hence the recording medium 1100 that is insufficiently dried may be delivered to the second conveying member 2202. The second conveying member 2202 includes the mechanism for adsorbing the recording medium 1100 and hence the moisture may be liable to move into the recording medium 1100. Accordingly, the occurrence of the cockling cannot be sufficiently suppressed in some cases. In addition, when the $T_2$ becomes relatively long as compared to the $T_1$, the distribution of the water in the recording medium may be nonuniform owing to its overdrying and hence the occurrence of the cockling cannot be sufficiently suppressed in some cases. The ratio $T_2/T_1$ is preferably 1.1 times or more, more preferably 1.1 times or more to 1.9 times or less.

As illustrated in FIG. 1, in the blowing portion 2000, air knives 2300 may be arranged between the conveying member 1300 and the first conveying member 2201, between the first conveying member 2201 and the second conveying member 2202 and between the second conveying member 2202 and the conveying member 3200, respectively. In particular, the blowing portion 2000 preferably includes the air knife 2300 serving as a third blowing device that applies an air pressure to the recording surface of the recording medium 1100, the air knife being arranged between a first combination and a second combination arranged to be distant from each other, the first combination including the first conveying member 2201 and the first blowing device 2101, the second combination including the second conveying member 2202 and the second blowing device 2102. When the first combination (the first conveying member 2201 and the first blowing device 2101) and the second combination (the second conveying member 2202 and the second blowing device 2102) for forming the blowing portion are arranged to be distant from each other, interference or stagnation hardly occurs between the first conveying member and the second conveying member. Accordingly, the recording medium can be conveyed to the next step without a hitch while the recording surface of the recording medium having applied thereto the ink is dried. In addition, the arrangement of the air knives 2300 presses down the lifting of the tip portion of the recording medium 1100, which has been conveyed, with the air pressure from the air knives 2300. Thus, the collision of the tip portion of the recording medium 1100 with the first blowing device 2101, the second blowing device 2102 and the fixing member 3100 is avoided and hence the occurrence of a conveyance failure can be suppressed. Further, the arrangement of the air knives 2300 can suppress an excessive increase in temperature in the recording portion 1000 due to the flow of high-temperature air in the blowing portion 2000 into the recording portion 1000. As a result, the conveyability of the recording medium can be improved.

Instead of arranging, for example, a mechanism for heating or cooling air or a mechanism for humidifying or dehumidifying air in each of the air knives 2300, air taken from the periphery of the ink jet recording apparatus 100 is preferably jetted from the air knife 2300 as it is while its temperature and humidity are kept unchanged. Accordingly, it is preferred that air be taken from a portion in the ink jet recording apparatus 100 except the blowing portion 2000 or from the outside of the ink jet recording apparatus 100 and be sent as it is to each of the air knives 2300 to be blown therefrom.

The air pressure to be applied from each of the air knives 2300 to the recording surface of the recording medium 1100 is preferably set to 100 Pa or more to 1,000 Pa or less. When the air pressure is less than 100 Pa, a role as an air curtain that suppresses the flow of the high-temperature air in the blowing portion 2000 into the recording portion 1000 may not be sufficiently obtained and a suppressing effect on the lifting of the recording medium 1100 may not be sufficiently obtained. As a result, the conveyability of the recording medium may not be sufficiently obtained. Meanwhile, when the air pressure is more than 1,000 Pa, the recording medium 1100 may be liable to sink in a space between the conveying member 1300 and the first conveying member 2201, a space between the first conveying member 2201 and the second conveying member 2202, and a space between the second conveying member 2202 and the conveying member 3200. Further, the recording medium 1100 may also be liable to sink in a distant portion (between the first combination and the second combination). In each case, a reduction in image quality such as an image shift and the like, and the jamming of the recording medium and the like cannot be sufficiently suppressed and hence the conveyability of the recording medium may not be sufficiently obtained.

When flat paper is used as the recording medium 1100, the conveying length of the first conveying member 2201 is preferably equal to or more than the length of the flat paper. The term "length of the flat paper" as used herein refers to a length parallel to a conveying direction at the time of the conveyance of the flat paper. When the length of the flat paper is set to be equal to or more than the conveying length of the first conveying member 2201, the recording medium 1100 is adsorbed by the second conveying member 2202 including the adsorption mechanism and the conveying member 1300 including the adsorption mechanism in the recording portion 1000 at the same time. As a result, a reduction in image quality such as an image shift and the like, and the jamming of the recording medium and the like cannot be sufficiently suppressed and hence the conveyability of the recording medium may not be sufficiently obtained.

[Fixing Portion]

As illustrated in FIG. 1, the fixing portion (second heating unit) 3000 is a contact-type heating and pressurizing mechanism including the fixing member 3100 serving as a fixing belt such as an endless belt and the conveying member 3200. The recording apparatus of the present invention preferably further includes, after the blowing portion, a fixing portion configured to bring the fixing member 3100 into contact with the region of the recording medium having applied thereto the liquids to heat the recording medium. In addition, the fixing portion 3000 preferably includes a second heating unit configured to subject the recording surface and rear surface of the recording medium to contact heating. In the fixing portion 3000, the recording medium 1100 is conveyed by the conveying member 3200. In addition, the fixing member 3100 is brought into contact with the recording medium 1100 under a state in which the recording medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the blowing portion 2000 including the first heating unit, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium 1100. Herein, the ink preferably contains a resin particle. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other. The conveying member 3200 may be heated as required. In view of a conveying speed and an environmental temperature, the temperatures of the fixing member 3100 and the conveying member 3200 may be set so that the surface of the recording medium may have a desired temperature. Specifically, the temperature of the fixing member 3100 is set to preferably 50° C. or more to 120° C. or less, more preferably 60° C. or more to 110° C. or less, particularly preferably 70° C. or more to 100° C. or less. In addition, the temperature of the recording surface of the recording medium is set to preferably 60° C. or more to 100° C. or less, more preferably 70° C. or more to less than 100° C. The temperature of the recording surface of the recording medium is preferably set to 95° C. or less. From the viewpoint of abrasion resistance, the temperature of the recording surface of the recording medium heated by the fixing portion (second heating unit) is preferably higher than the glass transition temperature of the resin particle. In particular, the temperature of the recording surface of the recording medium heated by the fixing portion (second heating unit) is more preferably higher than the glass transition temperature of the resin particle by 10° C. or more. A difference (temperature of recording surface-glass transition temperature of resin particle) between the temperature of the recording surface of the recording medium and the glass transition temperature of the resin particle in the ink is set to preferably 1° C. or more, more preferably 5° C. or more, particularly preferably 10° C. or more. The temperature of the fixing member 3100 may be measured with, for example, a radiation thermometer. The radiation thermometer may be arranged, for example, near an end portion (terminal) of the contact-type heating and pressurizing mechanism. The radiation thermometer may be specifically, for example, a thermometer available under the product name "RADIATION THERMOMETER IT-545S" (manufactured by Horiba, Ltd.). In addition, the temperature of the recording surface of the recording medium may be measured with, for example, a non-contact-type radiation thermometer including a radiation thermometer at the outlets of the fixing member 3100 and the conveying member 3200.

When the ink contains the resin particle, the temperature of the fixing member 3100 is preferably set to a temperature equal to or more than the glass transition temperature of the resin particle in the ink because the resin particle easily softens to form a film and hence the abrasion resistance of the image can be improved. In addition, the resin particle melts to stick to the recording medium and hence the occurrence of its cockling can be further suppressed. When the ink contains a wax particle, the temperature of the fixing member 3100 is preferably set to be lower than the melting point of a wax for forming the wax particle. Thus, the wax that is suppressed from melting easily remains on the surface of the image and hence the abrasion resistance of the image can be improved. The temperature of the contact-type heating and pressurizing mechanism (fixing member 3100) may be measured with a radiation thermometer. The radiation thermometer may be specifically, for example, a thermometer available under the product name "RADIATION THERMOMETER IT-545S" (manufactured by Horiba, Ltd.).

A nip pressure between the fixing member 3100 and the conveying member 3200, that is, a pressure to be applied to the recording medium when the recording medium passes the contact-type heating and pressurizing mechanism is set to preferably 10 Pa or more to 1,000 Pa or less, more preferably 10 Pa or more to 500 Pa or less. In addition, the pressure is particularly preferably set to 10 Pa or more to 400 Pa or less.

A time period (nip time) required for the recording medium to pass the contact-type heating and pressurizing mechanism is preferably 0.25 second or more to 5.0 seconds or less, more preferably 0.5 second or more to 4.0 seconds or less, particularly preferably 1.0 second or more to 3.0 seconds or less.

As illustrated in FIG. 1, the contact-type heating and pressurizing mechanism includes the fixing member 3100 that is brought into contact with the recording medium 1100 to heat the ink. In addition, the moisture permeability of the fixing member 3100 is preferably 10,000 g/(m$^2$·24 h) or less. When the moisture permeability of the fixing member falls within the above-mentioned range, the recording medium 1100 can be efficiently heated. The moisture permeability of the fixing member may be measured in conformity with "Testing Methods for Determination of the Water Vapour Transmission Rate of Moisture-Proof Packaging Materials" of JIS Z 0208.

The temperature of the rear surface of the recording medium 1100 heated by the first heating unit 2010 is preferably less than 100° C. In addition, the temperature of the recording surface of the recording medium 1100 heated by the fixing portion (second heating unit) 3000 is preferably less than 100° C. In addition, a difference between the temperature of the recording surface of the recording medium 1100 at the time of the application of the ink and the temperature of the rear surface of the recording medium 1100 heated by the first heating unit 2010 is preferably less than 80° C. Thus, the occurrence of the cockling can be further suppressed while the overdrying of the recording medium 1100 is prevented. The temperature of the recording surface of the recording medium at the time of the application of the ink may be measured with, for example, a non-contact-type radiation thermometer at the outlet of the ink applying device 1202. The temperature of the rear surface of the recording medium 1100 heated by the first heating unit 2010 and the temperature of the recording surface of the recording medium 1100 heated by the second heating unit are each preferably 95° C. or less. In addition, the difference between the temperature of the recording surface of the recording medium 1100 at the time of the application of the ink and the temperature of the rear surface of the recording medium 1100 heated by the first heating unit 2010 is more preferably 75° C. or less, still more preferably 30° C. or less.

Figure 9:
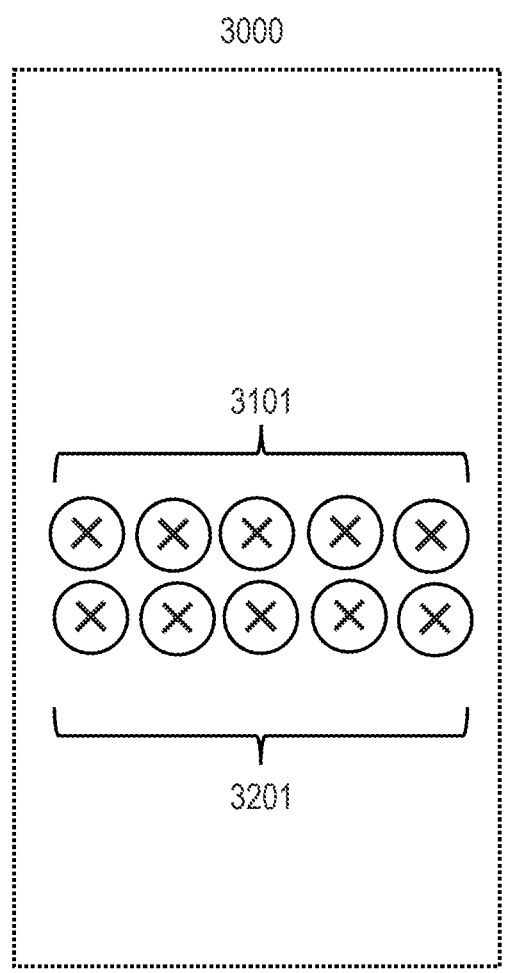
FIG. 9 is a schematic view for illustrating another example of a second heating unit.

FIG. 9 is a schematic view for illustrating another example of the second heating unit. Herein, a difference from the fixing portion described in FIG. 1 and the foregoing is described. The fixing member (second heating unit) 3000 illustrated in FIG. 9 is a contact-type heating and pressurizing mechanism including a plurality of fixing rollers 3101 and a plurality of conveying members 3201 arranged to face these fixing rollers 3101. When the recording medium 1100 having applied thereto the liquids such as the ink passes a space between the fixing rollers 3101 and the conveying members 3201, an image is fixed to the recording medium. The extent to which the image is fixed to the recording medium may be adjusted by controlling, for example, the numbers of the fixing rollers 3101 and the conveying members 3201, the time period for which the recording medium is nipped by the rollers and the members, a temperature and a pressure.

The fixing portion (second heating unit) 3000 is preferably such a heated fixing belt (the fixing member 3100) as illustrated in FIG. 1 rather than the fixing rollers 3101 as illustrated in FIG. 9. The fixing member 3100 such as a fixing belt illustrated in FIG. 1 can further suppress the occurrence of the cockling because the member has a correcting force on the deformation of the recording medium stronger than that of the fixing rollers 3101 illustrated in FIG. 9.

[Cooling Portion]

The cooling portion 4000 includes the cooling member 4100 and a conveying member 4200 (FIG. 1). The cooling portion 4000 cools the recording medium 1100 that has passed the blowing portion 2000 and the fixing portion 3000 to have a high temperature. The cooling member 4100 may have any configuration as long as the member can cool the recording medium 1100. Approaches, such as air cooling and water cooling, may each be utilized. Of those, an approach including blowing a gas that is not heated is preferred in terms of safety and energy efficiency. In addition, the utilization of the following mechanism easily improves cooling efficiency: the mechanism has built therein a fan for jetting a gas on the recording medium 1100 and blows air thereto. In view of a conveying speed and an environmental temperature, the temperature of a cooling unit may be set so that the image of the recording medium may have a desired temperature. Specifically, the temperature of the cooling unit (e.g., blowing) is set to preferably 20° C. or more to 60° C. or less, more preferably 25° C. or more to 50° C. or less. When a gas is blown to cool the recording medium, its air speed is preferably set to 1 m/s or more to 100 m/s or less. The adoption of such conditions can suppress the deformation of the recording medium 1100 to be loaded in the sheet delivery portion 6000 to be described later and the sticking (blocking) of the image.

[Reversing Portion]

When double-sided recording is performed, the recording medium 1100 is reversed through utilization of the reversing portion 5000 (FIG. 1). The recording medium 1100 having the image recorded on its recording surface (front surface) passes the cooling portion 4000 and is then diverged and conveyed, followed by reversal by a reversing device 5100. The recording medium 1100 that has been reversed is conveyed to the sheet feeding device 1400 of the recording portion 1000 under a state in which the liquids are applied to its rear surface (surface opposite to the recording surface (front surface)).

[Sheet Delivery Portion]

The recording medium 1100 after the image recording is stored in the sheet delivery portion 6000 (FIG. 1). The recording medium 1100 that has passed the cooling portion 4000 after the performance of single-sided recording or double-sided recording is conveyed by the conveying member 6100 to be finally stored under the state of being loaded in the recording medium storage portion 6200. The two or more recording medium storage portions 6200 may be arranged for, for example, separately storing different recorded products.

(Reaction Liquid)

The recording method of the present invention preferably further includes, before an ink applying step of applying the aqueous ink to the recording medium, a reaction liquid applying step of applying an aqueous reaction liquid, which contains a reactant that reacts with the aqueous ink, to the recording medium. Respective components to be used in the reaction liquid and the like are described in detail below.

[Reactant]

The reaction liquid is brought into contact with the ink to react with the ink, to thereby aggregate components (a component having an anionic group such as a resin, a surfactant, and a self-dispersible pigment) in the ink. The reaction liquid contains the reactant. When the reactant is present, at the time of contact between the ink and the reactant on the recording medium, the state of presence of the component having an anionic group in the ink is destabilized and hence the aggregation of the ink can be accelerated. In addition, when the aggregation of the ink is accelerated, the viscosity thereof increases and hence the permeation of the moisture in the ink into the recording medium can be suppressed. As a result, the occurrence of the cockling can be further suppressed. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink to be described later.

A water-soluble organic solvent to be described later that can be incorporated into the ink may be incorporated into the aqueous medium to be used in the reaction liquid. The content (% by mass) of the water-soluble organic solvent in the reaction liquid is preferably 1.0% by mass or more to 45.0% by mass or less with respect to the total mass of the reaction liquid. In addition, the water-soluble organic solvent preferably contains a specific water-soluble hydrocarbon compound to be described later. The use of the reaction liquid containing the water-soluble hydrocarbon compound can further suppress the occurrence of the cockling of the recording medium. The content (% by mass) of the water-soluble hydrocarbon compound in the reaction liquid is preferably 1.0% by mass or more to 20.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

[Other Component]

The reaction liquid may contain various other components as required. Examples of the other components may include the same examples as those of other components that can be incorporated into the ink to be described later.

[Physical Properties of Reaction Liquid]

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

(Ink)

The ink to be used in the recording method of the present invention is an aqueous ink for ink jet including a specific water-soluble organic solvent. Respective components to be used in the ink and the like are described in detail below.

[Coloring Material]

The ink preferably includes the coloring material. A pigment or a dye may be used as the coloring material. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. Of those, not a resin-bonded pigment or a microcapsule pigment but a resin-dispersed pigment having a resin serving as a dispersant, the resin being caused to physically adsorb to its particle surface, is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

[Resin]

A resin may be incorporated into the ink. The content (% by mass) of the resin in the ink is preferably 0.1% by mass or more to 20.0% by mass or less, more preferably 0.5% by mass or more to 15.0% by mass or less with respect to the total mass of the ink.

The resin may be added to the ink for (i) stabilizing the dispersed state of the pigment, that is, as a resin dispersant or an aid therefor. In addition, the resin may be added to the ink for (ii) improving the various characteristics of an image to be recorded. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The ink preferably includes a resin particle out of those resins. The use of the ink including the resin particle can record an image improved in abrasion resistance.

[Composition of Resin Particle]

Any monomer may be used as a monomer for forming the resin particle as long as the monomer can be polymerized by, for example, an emulsion polymerization method, a suspension polymerization method or a dispersion polymerization method. Examples of the resin particle may include acrylic, vinyl acetate-based, ester-based, ethylene-based, urethane-based, synthetic rubber-based, vinyl chloride-based, vinylidene chloride-based and olefin-based resin particles. Of those, an acrylic resin particle or a urethane-based resin particle is preferred.

Examples of a monomer for forming the acrylic resin particle may include: an $\alpha,\beta$-unsaturated carboxylic acid, such as (meth)acrylic acid, maleic acid, crotonic acid, angelic acid, itaconic acid or fumaric acid, and a salt thereof; an ester compound of an $\alpha,\beta$-unsaturated carboxylic acid, such as ethyl (meth)acrylate, methyl (meth)acrylate, butyl (meth)acrylate, methoxyethyl (meth)acrylate, ethoxyethyl (meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxytetraethylene glycol (meth)acrylate, methoxypolyethylene glycol (meth)acrylate, cyclohexyl (meth)acrylate, isobornyl (meth)acrylate, N,N-dimethylaminopropyl (meth)acrylate, monobutyl maleate or dimethyl itaconate; an alkylamide compound of an $\alpha,\beta$-unsaturated carboxylic acid, such as (meth)acrylamide, dimethyl (meth)acrylamide, N,N-dimethylethyl (meth)acrylamide, N,N-dimethylpropyl (meth)acrylamide, isopropyl (meth)acrylamide, diethyl (meth)acrylamide, (meth)acryloylmorpholine, maleic acid monoamide or crotonic acid methylamide; an $\alpha,\beta$-ethylenically unsaturated compound having an aryl group, such as methacrylonitrile, styrene, $\alpha$-methylstyrene, vinyl phenylacetate, benzyl (meth)acrylate or 2-phenoxyethyl (meth)acrylate; and an ester compound of a polyfunctional alcohol, such as ethylene glycol diacrylate or polypropylene glycol dimethacrylate. Those resin particles may each be a homopolymer obtained by polymerizing a single monomer or may be a copolymer obtained by polymerizing two or more kinds of monomers. When the resin particle is a copolymer, the copolymer may be a random copolymer or a block copolymer. Of those, a resin particle using a hydrophilic monomer and a hydrophobic monomer is preferred. Examples of the hydrophilic monomer may include an $\alpha,\beta$-unsaturated carboxylic acid and a salt thereof and examples of the hydrophobic monomer may include an ester compound of an $\alpha,\beta$-unsaturated carboxylic acid and an $\alpha,\beta$-ethylenically unsaturated compound having an aryl group.

The urethane-based resin particle is a resin particle synthesized by causing a polyisocyanate serving as a compound having two or more isocyanate groups and a polyol compound serving as a compound having two or more hydroxyl groups to react with each other. In the present invention, any urethane-based resin particle obtained by causing a known polyisocyanate compound and a known polyol compound to react with other may be used as long as the particle satisfies the above-mentioned conditions of the resin particle.

[Composition of Water-Soluble Resin]

Examples of the water-soluble resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth)acrylic acid and a hydrophobic unit derived from at least one of a monomer having an aromatic ring and a (meth)acrylic acid ester-based monomer is preferred. A resin having a hydrophilic unit derived from (meth)acrylic acid and a hydrophobic unit derived from at least one monomer of styrene and $\alpha$-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, $\alpha$-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Properties of Resin]

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. In contrast, when a particle having a particle diameter is measured, the resin can be judged to be a resin particle (water-insoluble resin). Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA- EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The acid value of a resin for forming the resin particle is preferably 5 mgKOH/g or more to 100 mgKOH/g or less. The weight-average molecular weight of the resin for forming the resin particle is preferably 1,000 or more to 3,000,000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC). The resin particle does not need to include any coloring material.

[Wax Particle]

A particle formed of a wax (wax particle) may be incorporated into the ink. The use of the ink including the wax particle can record an image further improved in abrasion resistance. The wax in this specification may be a composition blended with a component except the wax or may be the wax itself. The wax particle may be dispersed with a dispersant, such as a surfactant or a water-soluble resin. The waxes may be used alone or in combination thereof. The content (% by mass) of the wax particle in the ink is preferably 0.1% by mass or more to 10.0% by mass or less, more preferably 1.0% by mass or more to 5.0% by mass or less with respect to the total mass of the ink.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at normal temperature (25° C.). The melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

[Aqueous Medium]

The ink to be used in the recording method of the present invention is an aqueous ink including at least water as an aqueous medium. An aqueous medium that is a mixed solvent of the water and a water-soluble organic solvent may be incorporated into the ink. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 40.0% by mass or less with respect to the total mass of the ink. Solvents that may be used in an ink for ink jet, such as alcohols, (poly)alkylene glycols, glycol ethers, nitrogen-containing solvents and sulfur-containing solvents, may each be used as the water-soluble organic solvent. The water-soluble organic solvents may be used alone or in combination thereof.

The water-soluble organic solvent to be incorporated into the ink contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group (—S(=O)$_2$—) or an ether group (—O—) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the occurrence of the cockling of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for constituting the recording medium to exhibit a suppressing action on the occurrence of the cockling. The content (% by mass) of the water-soluble hydrocarbon compound in the ink is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

When the above-mentioned water-soluble organic solvent is a hydrocarbon compound substituted with 2 hydroxy groups, the number of carbon atoms present between the 2 hydroxy groups is preferably 5 or more. The expression "number of carbon atoms present between the 2 hydroxy groups" as used herein means the shortest number of carbon atoms from a carbon atom bonded to one hydroxy group to a carbon atom bonded to the other hydroxy group. For example, the number of carbon atoms present between the 2 hydroxy groups of 3-methyl-1,5-pentanediol is 5 and the number of carbon atoms present between the 2 hydroxy groups of 2,2,4-trimethyl-1,3-pentanediol is 3. Such water-soluble organic solvent is suppressed from permeating a recording medium. Accordingly, the use of the ink including the above-mentioned water-soluble organic solvent can further suppress the occurrence of the cockling.

[Other Component]

The ink may include various other components as required. Examples of other components may include various additives, such as an antifoaming agent, a surfactant, a pH adjustor, a viscosity modifier, a rust inhibitor, an antiseptic, a fungicide, an antioxidant and an anti-reducing agent. However, the ink is preferably free of the reactant to be incorporated into the reaction liquid.

[Physical Properties of Ink]

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Preparation of Reaction Liquid>

Respective components shown in Table 1 were mixed and sufficiently stirred, followed by filtration with a cellulose acetate filter having a pore size of 3.0 μm (manufactured by Advantec) under pressure. Thus, respective reaction liquids were prepared. In Table 1, the term "CATIOMASTER PDT-2" represents the product name of a dimethylamine-epichlorohydrin condensation-type polymer aqueous solution (resin content: 60.0%, an aqueous solution of a cationic resin) manufactured by Yokkaichi Chemical Co., Ltd. In addition, the term "ACETYLENOL E100" represents the product name of a hydrocarbon-based nonionic surfactant manufactured by Kawaken Fine Chemicals Co., Ltd.

TABLE 1

Compositions of reaction liquids

| | Reaction liquid | | |
|---|---|---|---|
| | 1 | 2 | 3 |
| CATIOMASTER PDT-2 | 2.0 | | |
| Succinic acid | | 2.0 | |
| Magnesium nitrate hexahydrate | | | 15.0 |
| Glycerin | 8.0 | 8.0 | 8.0 |
| ACETYLENOL E100 | 1.0 | 1.0 | 1.0 |
| Ion-exchanged water | 89.0 | 89.0 | 76.0 |

<Preparation of Pigment Dispersion Liquid>
(Pigment Dispersion Liquid 1)

A styrene-ethyl acrylate-acrylic acid copolymer (resin 1) having an acid value of 150 mgKOH/g and a weight-average molecular weight of 8,000 was prepared. 20.0 Parts of the resin 1 was neutralized with potassium hydroxide whose molar amount was equivalent to its acid value. In addition, an appropriate amount of pure water was added to the neutralized product to prepare an aqueous solution of the resin 1 in which the content of the resin (solid content) was 20.0%. 20.0 Parts of a pigment (C.I. Pigment Red 122), 50.0 parts of the aqueous solution of the resin 1 and 30.0 parts of ion-exchanged water were mixed to provide a mixture. The resultant mixture was subjected to 50 passes of dispersion treatment with a nanomizer (manufactured by Yoshida Kikai Co., Ltd.) at a pressure of 150 MPa. After that, the treated product was centrifuged at a number of revolutions of 5,000 rpm for 30 minutes so that a coarse particle was removed. The residue was filtered with a cellulose acetate filter having a pore size of 3.0 μm (manufactured by Advantec) under pressure to prepare a pigment dispersion liquid 1 in which the content of the pigment was 20.0% and the content of the resin dispersant (resin 1) was 10.0%.
(Pigment Dispersion Liquid 2)

A pigment dispersion liquid 2 having a pigment content of 20.0% and a resin dispersant content of 10.0% was prepared by the same procedure as that of the above-mentioned pigment dispersion liquid 1 except that the pigment was changed to carbon black.
(Pigment Dispersion Liquid 3)

A pigment dispersion liquid 3 having a pigment content of 20.0% and a resin dispersant content of 10.0% was prepared by the same procedure as that of the above-mentioned pigment dispersion liquid 1 except that the pigment was changed to C.I. Pigment Blue 15:3.
(Pigment Dispersion Liquid 4)

A pigment dispersion liquid 4 having a pigment content of 20.0% and a resin dispersant content of 10.0% was prepared by the same procedure as that of the above-mentioned pigment dispersion liquid 1 except that the pigment was changed to C.I. Pigment Yellow 74.
(Pigment Dispersion Liquid 5)

An aqueous solution obtained by dissolving 5.0 g of concentrated hydrochloric acid in 5.5 g of ion-exchanged water was brought into the state of being cooled to 5° C., followed by the addition of 1.5 g of 4-aminophthalic acid to the solution. A container containing the aqueous solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of carbon black was added to the mixture under stirring and the whole was further stirred for 15 minutes to provide a slurry. The resultant slurry was filtered with filter paper (product name: "STANDARD FILTER PAPER No. 2," manufactured by Advantec), and particles remaining on the filter paper were sufficiently washed with water and dried in an oven at 110° C. After that, a sodium ion was substituted with a potassium ion by an ion exchange method. Thus, a self-dispersion pigment in which a —$C_6H_3$—$(COOK)_2$ group was bonded to the particle surface of the pigment was obtained. An appropriate amount of pure water was added to adjust the content of the pigment. Thus, a pigment dispersion liquid 5 having a pigment content of 20.0% was obtained.
<Production of Resin Particle>
(Resin Particles 1 and 2)

0.2 parts of potassium persulfate and 74.0 parts of ion-exchanged water were mixed to prepare a solution. In addition, 24.0 parts of ethyl methacrylate (EMA), 1.5 parts of methacrylic acid (MAA) and 0.3 part of a reactive surfactant were mixed to prepare an emulsion. A surfactant available under the product name "ADEKA REASOAP ER-20" (manufactured by Adeka Corporation, nonionic surfactant, number of moles of added ethylene oxide groups: 20) was used as the reactive surfactant. Under a nitrogen atmosphere, the emulsion was dropped into the solution over 1 hour and was polymerized while the mixture was stirred at 80° C. After that, the polymer was further stirred for 2 hours. After the polymer had been cooled to room temperature (25° C.), ion-exchanged water and an aqueous solution of potassium hydroxide were added to the polymer to provide a water dispersion liquid of resin particle 1 in which the content of the resin particle was 25.0%.

0.2 parts of potassium persulfate and 74.0 parts of ion-exchanged water were mixed to prepare a solution. In addition, 19.5 parts of methyl methacrylate (MMA), 4.5 parts of n-butyl methacrylate (nBMA), 1.5 parts of MAA and 0.3 part of the reactive surfactant were mixed to prepare an emulsion. Under a nitrogen atmosphere, the emulsion was dropped into the solution over 1 hour and was polymerized while the mixture was stirred at 80° C. After that, the polymer was further stirred for 2 hours. After the polymer had been cooled to room temperature (25° C.), ion-exchanged water and an aqueous solution of potassium hydroxide were added to the polymer to provide a water dispersion liquid of resin particle 2 in which the content of the resin particle was 25.0%.

The compositions and characteristics of the resultant resin particles are shown in Table 2. Methods of measuring the volume-based 50% cumulative particle diameter ($D_{50}$ (nm)) of each of the resin particles and the glass transition temperature (Tg (° C.)) of the resin particle are described below.
[Volume-Based 50% Cumulative Particle Diameter of Resin Particle]

The water dispersion liquid of each of the resin particles was diluted with pure water. Thus, a liquid containing the resin particle in which the content of the resin particle was 1.0% was prepared as a measurement sample. The volume-based 50% cumulative particle diameter ($D_{50}$ (nm)) of the resin particle in the measurement sample was measured with a particle size distribution meter based on a dynamic light scattering method (product name: "NANOTRAC UPA-EX150", manufactured by Nikkiso Co., Ltd.). Measurement conditions were set as follows: SetZero: 30 seconds; number of times of measurement: 3; measurement time: 180 seconds; shape: perfect spherical shape; and refractive index: 1.6.
[Glass Transition Temperature of Resin Particle]

A resin obtained by drying the water dispersion liquid of each of the resin particles was prepared as a sample. A temperature increase cycle in which the temperature of the resin was increased from −70° C. to 180° C. at a rate of 10° C./min with a differential scanning calorimeter (product name: "Q200", manufactured by TA Instruments) was performed twice to measure the glass transition temperature (Tg (° C.)) of the resin particle.

TABLE 2

Conditions for production of resin particles and their characteristics

| Resin particle | Details of loaded monomer (part(s)) | | | | | Characteristic | |
|---|---|---|---|---|---|---|---|
| | MMA | EMA | nBMA | MAA | Reactive surfactant | $D_{50}$ (nm) | Tg (° C.) |
| 1 | | 24.0 | | 1.5 | 0.3 | 100 | 70 |
| 2 | 19.5 | | 4.5 | 1.5 | 0.3 | 100 | 90 |

<Preparation of Ink>

Respective components (unit: %) shown in Table 3 and Table 4 were mixed and sufficiently stirred, followed by filtration with a cellulose acetate filter having a pore size of 3.0 μm (manufactured by Advantec) under pressure. Thus, respective inks were prepared. A numerical value attached to polyethylene glycol is the number-average molecular weight of the polyethylene glycol. In Table 3 and Table 4, the term "SURFYNOL 440" represents the product name of a surfactant manufactured by Shin-Etsu Chemical Co., Ltd.

TABLE 3

Compositions of inks

| | Ink | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pigment dispersion liquid 1 | 20.0 | | | | | 20.0 | 20.0 | 20.0 | 20.0 | 20.0 | 20.0 | 20.0 |
| Pigment dispersion liquid 2 | | 20.0 | | | | | | | | | | |
| Pigment dispersion liquid 3 | | | 20.0 | | | | | | | | | |
| Pigment dispersion liquid 4 | | | | 20.0 | | | | | | | | |
| Pigment dispersion liquid 5 | | | | | 20.0 | | | | | | | |
| Water dispersion liquid of resin particle 1 | 44.0 | 44.0 | 44.0 | 44.0 | 44.0 | 44.0 | 44.0 | 44.0 | 44.0 | 44.0 | 44.0 | 44.0 |
| Water dispersion liquid of resin particle 2 | | | | | | | | | | | | |
| β-Alanine | | | | | | 20.0 | | | | | 10.0 | |
| Bis(2-hydroxyethyl)sulfone | | | | | | | 20.0 | | | | | |
| Diethylene glycol | | | | | | | | | | | | |
| Glycerin | | | | | | | | | | | | |
| Triethylene glycol | | | | | | | | 20.0 | | | | |
| Polyethylene glycol 600 | 20.0 | 20.0 | 20.0 | 20.0 | 20.0 | | | | | | 10.0 | 10.0 |
| Sorbitol | | | | | | | | | 20.0 | | | |
| 1,2-Pentanediol | | | | | | | | | | | | |
| 1,5-Pentanediol | | | | | | | | | | 20.0 | | |
| 2,4-Pentanediol | | | | | | | | | | | | |
| 2-Ethyl-1,3-hexanediol | | | | | | | | | | | | |
| 2,2,4-Trimethyl-1,3-pentanediol | | | | | | | | | | | | |
| 2,4,7,9-Tetramethyl-4,7-decanediol | | | | | | | | | | | | |
| Sodium hexanesulfonate | | | | | | | | | | | | 10.0 |
| SURFYNOL 440 | 0.5 | 0.5 | 0.5 | 0.5 | 0.5 | 0.5 | 0.5 | 0.5 | 0.5 | 0.5 | 0.5 | 0.5 |
| Ion-exchanged water | 15.5 | 15.5 | 15.5 | 15.5 | 15.5 | 15.5 | 15.5 | 15.5 | 15.5 | 15.5 | 15.5 | 15.5 |

TABLE 4

Compositions of inks

| | Ink | | | | | | | | | | |
|---|---|---|---|---|---|---|---|---|---|---|---|
| | 13 | 14 | 15 | 16 | 17 | 18 | 19 | 20 | 21 | 22 | 23 |
| Pigment dispersion liquid 1 | 20.0 | 20.0 | 20.0 | 20.0 | 20.0 | 20.0 | 20.0 | 20.0 | 20.0 | 20.0 | 20.0 |
| Pigment dispersion liquid 2 | | | | | | | | | | | |
| Pigment dispersion liquid 3 | | | | | | | | | | | |
| Pigment dispersion liquid 4 | | | | | | | | | | | |
| Pigment dispersion liquid 5 | | | | | | | | | | | |
| Water dispersion liquid of resin particle 1 | 44.0 | | | 44.0 | 44.0 | 44.0 | 44.0 | 44.0 | 44.0 | 44.0 | 44.0 |
| Water dispersion liquid of resin particle 2 | | | 44.0 | | | | | | | | |
| β-Alanine | | | | | | | | | | | |
| Bis(2-hydroxyethyl)sulfone | | | | | | | | | | | |
| Diethylene glycol | | | | | | | | | 20.0 | | |
| Glycerin | | | | | | | | | | 20.0 | 10.0 |
| Triethylene glycol | | | | | | | | | | | |
| Polyethylene glycol 600 | 10.0 | 20.0 | 20.0 | | | | | | | | |
| Sorbitol | | | | | | | | | | | |
| 1,2-Pentanediol | 10.0 | | | 20.0 | | | | | | | |
| 1,5-Pentanediol | | | | | | | | | | | |
| 2,4-Pentanediol | | | | | 20.0 | | | | | | |
| 2-Ethyl-1,3-hexanediol | | | | | | 20.0 | | | | | |
| 2,2,4-Trimethyl-1,3-pentanediol | | | | | | | 20.0 | | | | |
| 2,4,7,9-Tetramethyl-4,7-decanediol | | | | | | | | 20.0 | | | |
| Sodium hexanesulfonate | | | | | | | | | | | 10.0 |
| SURFYNOL 440 | 0.5 | 0.5 | 0.5 | 0.5 | 0.5 | 0.5 | 0.5 | 0.5 | 0.5 | 0.5 | 0.5 |
| Ion-exchanged water | 15.5 | 59.5 | 15.5 | 15.5 | 15.5 | 15.5 | 15.5 | 15.5 | 15.5 | 15.5 | 15.5 |

<Preparation of Recording Medium>

The following recording media 1 to 3 were prepared.

Recording medium 1: a recording medium available under the product name "OK PRINCE HIGH QUALITY", manufactured by Oji Paper Co., Ltd., size: B3 (36.4 cm×51.5 cm), basis weight: 81.4 g/m$^2$, thickness: 99 µm Recording medium 2: a recording medium available under the product name "OK PRINCE HIGH QUALITY", manufactured by Oji Paper Co., Ltd., size: larger than B3 (46.4 cm×51.5 cm), basis weight: 81.4 g/m$^2$, thickness: 99 µm Recording medium 3: a recording medium available under the product name "npi HIGH QUALITY", manufactured by Nippon Paper Industries Co., Ltd., size: B3 (36.4 cm×51.5 cm), basis weight: 104.7 g/m$^2$, thickness: 120 µm <Evaluation>

The ink jet recording apparatus 100 having a configuration illustrated in FIG. 1 was prepared. A reaction liquid and an ink whose kinds were shown in the left side of Table 5 were loaded into the reaction liquid applying device and ink applying device of the apparatus, respectively. Then, images were recorded on the recording media in accordance with evaluation conditions shown in Table 5 and Table 6. The time period ($T_1$ (sec)) required for each of the recording media to pass the top of the first conveying member of the apparatus and the time period ($T_2$ (sec)) required for the recording medium to pass the top of the second conveying member thereof were controlled by adjusting the speeds at which the recording medium was conveyed by the first conveying member and the second conveying member, respectively.

When only an ink was applied to record an image, the application amount of the ink was set to 9.5 g/m$^2$. In addition, when a reaction liquid and an ink were applied to record an image, the reaction liquid was applied to a recording medium by an ink jet system before the application of the ink. The application amount of the reaction liquid was set to 2 g/m$^2$ and the application amount of the ink was set to 7.5 g/m$^2$. However, at the time of the evaluation of cockling suppression to be described later, the application amount of the reaction liquid was set to 2 g/m$^2$ and the application amount of the ink was set to any one of 6 g/m$^2$, 7 g/m$^2$ or 7.5 g/m$^2$. In addition, when no reaction liquid was applied, the application amount of the ink was set to any one of 8 g/m$^2$, 9 g/m$^2$ or 9.5 g/m$^2$. In the blowing portion of the ink jet recording apparatus, a warm air speed was set to 2 m/sec and a warm air temperature was set to 80° C. In addition, in the fixing portion thereof, an image was fixed to the recording medium under the conditions of a temperature of 85° C., a nip pressure of 20 Pa and a nip time of 2 seconds. Then, the air pressure of the air knife between the first heating unit and second heating unit of the apparatus was adjusted to a value shown in Table 5. The recording medium was set so that the lengthwise direction of the recording medium was parallel to a sheet feeding direction.

Figure 5:
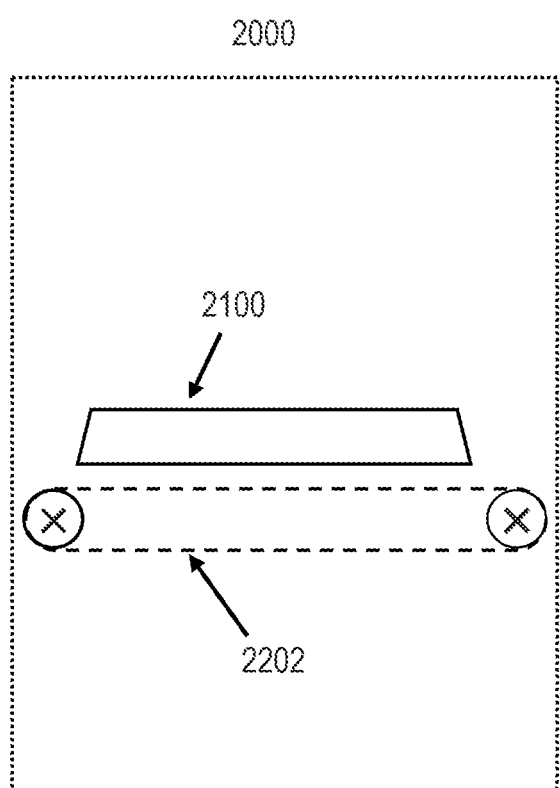
FIG. 5 is a schematic view for illustrating another example of a blowing portion.
Figure 6:
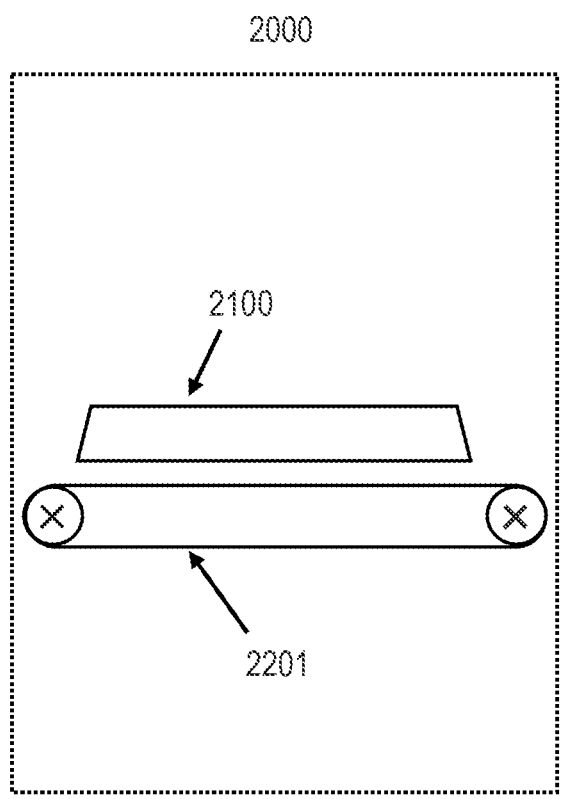
FIG. 6 is a schematic view for illustrating still another example of the blowing portion.
Figure 7:
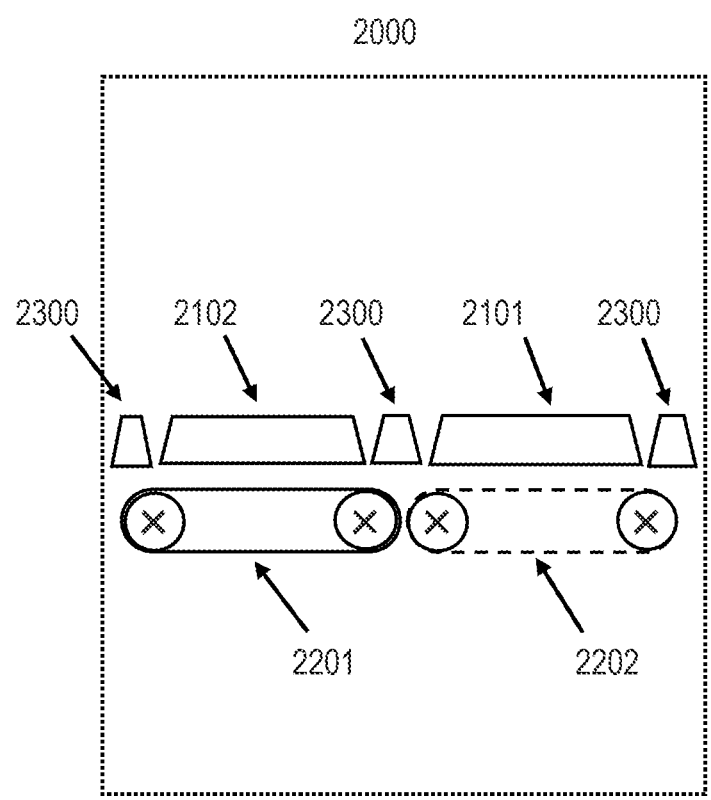
FIG. 7 is a schematic view for illustrating still another example of the blowing portion.

FIG. 5 to FIG. 7 are schematic views for illustrating examples of the blowing portion of the ink jet recording apparatus used in Comparative Examples 1 to 3. In Comparative Example 1, the ink jet recording apparatus including the blowing portion 2000 illustrated in FIG. 5 was used. The blowing portion 2000 illustrated in FIG. 5 includes a blowing device 2100 and the second conveying member 2202 including an adsorption mechanism but does not include the first conveying member. In Comparative Example 2, the ink jet recording apparatus including the blowing portion 2000 illustrated in FIG. 6 was used. The blowing portion 2000 illustrated in FIG. 6 includes the blowing device 2100 and the first conveying member 2201 free of an adsorption mechanism but does not include the second conveying member. In Comparative Example 3, the ink jet recording apparatus including the blowing portion 2000 illustrated in FIG. 7 was used. The blowing portion 2000 illustrated in FIG. 7 includes the second conveying member 2202 including an adsorption mechanism and the first conveying member 2201 free of an adsorption mechanism in the stated order. In the present invention, in evaluation criteria for each of the following items, while levels "AA", "A" and "B" were defined as acceptable levels, a level "C" was defined as an unacceptable level. The evaluation results are shown in the right sides of Table 6 and Table 7.

One of the following two systems (1 and 2) was adopted as the system by which the conveying member was heated in the first heating unit:
1: non-contact heating including using warm air from the second blowing device 2102 (FIG. 1); and
2: contact heating with the heating members 2203 (FIG. 8).

One of (i) a fixing belt (the second heating unit 3000 in FIG. 1, described as "belt" in Table 5 and Table 7) or (ii) a fixing roller (the second heating unit 3000 in FIG. 9, described as "roller" in Table 5) was used as a fixing member for forming the second heating unit. In addition, temperatures at the following sites were measured with a radiation thermometer:
the temperature of the recording surface of a recording medium at the time of ink application: the outlet of the ink applying device 1202 (FIG. 1);
the temperature of the recording surface of the recording medium heated by the first heating unit: the outlet of the second blowing device 2102 (FIG. 1);
the temperature of the rear surface of the recording medium heated by the first heating unit: the outlet of the second conveying member 2202 (FIG. 1); and
the temperature of the recording surface of the recording medium heated by the second heating unit: the outlet of the fixing member 3100 (FIG. 1) or the outlet of the fixing rollers 3101 (FIG. 9).

(Cockling Suppression)

A solid image measuring 18 cm in the longitudinal direction of a line head by 2 cm in a sheet feeding direction was recorded on a recording medium shown in Table 5. At this time, as described above, a total of 3 recording media were obtained by recording the above-mentioned solid image while changing the total application amount of a reaction liquid and an ink. After that, the recording media were each mounted on a horizontal and smooth stand having a sufficient area so that the recording medium became horizontal. The deformation (cockling) of the recording medium after the lapse of 30 seconds from the recording was visually observed at a viewing angle of 45° with respect to the recording medium and cockling suppression was evaluated in accordance with the following evaluation criteria. Herein, the viewing angle is defined as follows: the angle of the horizontal recording medium is defined as 0° and a case in which the recording medium is viewed from a direction perpendicular thereto is defined as 90°. A case in which no cockling is observed even when the total amount of the reaction liquid and the ink to be applied to the recording medium is increased means that the occurrence of the cockling is suppressed.

AA: No cockling was observed in each of the images.

A: Although the cockling was observed in the recording medium in which the total application amount of the reaction liquid and the ink was 9.5 g/m², no cockling was observed in the recording medium in which the total application amount of the reaction liquid and the ink was 9.0 g/m².

B: Although the cockling was observed in each of the recording medium in which the total application amount of the reaction liquid and the ink was 9.5 g/m² and the recording medium in which the total application amount of the reaction liquid and the ink was 9.0 g/m², no cockling was observed in the recording medium in which the total application amount of the reaction liquid and the ink was 8.0 g/m².

C: The cockling was observed even in the recording medium in which the total application amount of the reaction liquid and the ink was 8.0 g/m².

TABLE 5

Evaluation conditions

| | | | | | First heating unit | | | | Second heating unit | |
|---|---|---|---|---|---|---|---|---|---|---|
| | | | | | Temperature (° C.) | | System by which conveying | Air pressure of air | Temperature of recording | |
| | | Ink | Reaction liquid | Recording medium | Recording surface | Rear surface | member is heated | knife (Pa) | surface (° C.) | Fixing member |
| Example | 1 | 1 | 1 | 1 | 70 | 80 | 1 | 500 | 90 | Belt |
| | 2 | 2 | 1 | 1 | 70 | 80 | 1 | 500 | 90 | Belt |
| | 3 | 3 | 1 | 1 | 70 | 80 | 1 | 500 | 90 | Belt |
| | 4 | 4 | 1 | 1 | 70 | 80 | 1 | 500 | 90 | Belt |
| | 5 | 5 | 1 | 1 | 70 | 80 | 1 | 500 | 90 | Belt |
| | 6 | 6 | 1 | 1 | 70 | 80 | 1 | 500 | 90 | Belt |
| | 7 | 7 | 1 | 1 | 70 | 80 | 1 | 500 | 90 | Belt |
| | 8 | 8 | 1 | 1 | 70 | 80 | 1 | 500 | 90 | Belt |
| | 9 | 9 | 1 | 1 | 70 | 80 | 1 | 500 | 90 | Belt |
| | 10 | 10 | 1 | 1 | 70 | 80 | 1 | 500 | 90 | Belt |
| | 11 | 11 | 1 | 1 | 70 | 80 | 1 | 500 | 90 | Belt |
| | 12 | 12 | 1 | 1 | 70 | 80 | 1 | 500 | 90 | Belt |
| | 13 | 13 | 1 | 1 | 70 | 80 | 1 | 500 | 90 | Belt |
| | 14 | 1 | 1 | 3 | 70 | 80 | 1 | 500 | 90 | Belt |
| | 15 | 1 | 1 | 1 | 70 | 80 | 1 | 500 | 90 | Belt |
| | 16 | 1 | 1 | 1 | 70 | 80 | 1 | 500 | 90 | Belt |
| | 17 | 1 | 1 | 1 | 70 | 80 | 1 | 500 | 90 | Belt |
| | 18 | 1 | 1 | 1 | 70 | 80 | 1 | 500 | 90 | Belt |
| | 19 | 1 | 1 | 1 | 70 | 80 | 1 | 500 | 90 | Belt |
| | 20 | 1 | 1 | 1 | 70 | 80 | 1 | 500 | 90 | Belt |
| | 21 | 1 | 2 | 1 | 70 | 80 | 1 | 500 | 90 | Belt |
| | 22 | 1 | 3 | 1 | 70 | 80 | 1 | 500 | 90 | Belt |
| | 23 | 1 | None | 1 | 70 | 80 | 1 | 500 | 90 | Belt |
| | 24 | 14 | 1 | 1 | 70 | 80 | 1 | 500 | 90 | Belt |
| | 25 | 1 | 1 | 1 | 80 | 80 | 1 | 500 | 90 | Belt |
| | 26 | 15 | 1 | 1 | 70 | 80 | 1 | 500 | 90 | Belt |
| | 27 | 1 | 1 | 1 | 70 | 80 | 2 | 500 | 90 | Belt |
| | 28 | 1 | 1 | 1 | 85 | 95 | 1 | 500 | 90 | Belt |
| | 29 | 1 | 1 | 1 | 90 | 100 | 1 | 500 | 90 | Belt |
| | 30 | 1 | 1 | 1 | 90 | 100 | 1 | 500 | 90 | Belt |
| | 31 | 1 | 1 | 1 | 70 | 80 | 1 | 500 | 95 | Belt |
| | 32 | 1 | 1 | 1 | 70 | 80 | 1 | 500 | 100 | Belt |
| | 33 | 1 | 1 | 1 | 80 | 90 | 1 | 500 | 90 | Belt |
| | 34 | 1 | 1 | 1 | 80 | 90 | 1 | 500 | 90 | Belt |
| | 35 | 1 | 1 | 1 | 70 | 80 | 1 | 500 | 90 | Roller |
| | 36 | 16 | 1 | 1 | 70 | 80 | 1 | 500 | 90 | Belt |
| | 37 | 17 | 1 | 1 | 70 | 80 | 1 | 500 | 90 | Belt |
| | 38 | 18 | 1 | 1 | 70 | 80 | 1 | 500 | 90 | Belt |
| | 39 | 19 | 1 | 1 | 70 | 80 | 1 | 500 | 90 | Belt |
| | 40 | 20 | 1 | 1 | 70 | 80 | 1 | 500 | 90 | Belt |
| Comparative Example | 1 | 1 | 1 | 1 | 70 | 80 | 1 | 500 | 90 | Belt |
| | 2 | 1 | 1 | 1 | 70 | 80 | 1 | 500 | 90 | Belt |
| | 3 | 1 | 1 | 1 | 70 | 80 | 1 | 500 | 90 | Belt |
| | 4 | 21 | 1 | 1 | 70 | 80 | 1 | 500 | 90 | Belt |
| | 5 | 22 | 1 | 1 | 70 | 80 | 1 | 500 | 90 | Belt |
| | 6 | 23 | 1 | 1 | 70 | 80 | 1 | 500 | 90 | Belt |

TABLE 6

Evaluation conditions and evaluation results

| | | Evaluation condition | | | | | Evaluation result |
|---|---|---|---|---|---|---|---|
| | | Recording portion Temperature (° C.) Recording surface | $T_1$ (sec) | $T_2$ (sec) | Value of $T_2/T_1$ (times) | Remark | Cockling suppression |
| Example | 1 | 25 | 1.0 | 1.5 | 1.5 | FIG. 1 | AA |
| | 2 | 25 | 1.0 | 1.5 | 1.5 | FIG. 1 | AA |
| | 3 | 25 | 1.0 | 1.5 | 1.5 | FIG. 1 | AA |
| | 4 | 25 | 1.0 | 1.5 | 1.5 | FIG. 1 | AA |
| | 5 | 25 | 1.0 | 1.5 | 1.5 | FIG. 1 | AA |
| | 6 | 25 | 1.0 | 1.5 | 1.5 | FIG. 1 | AA |
| | 7 | 25 | 1.0 | 1.5 | 1.5 | FIG. 1 | AA |
| | 8 | 25 | 1.0 | 1.5 | 1.5 | FIG. 1 | AA |
| | 9 | 25 | 1.0 | 1.5 | 1.5 | FIG. 1 | AA |
| | 10 | 25 | 1.0 | 1.5 | 1.5 | FIG. 1 | AA |
| | 11 | 25 | 1.0 | 1.5 | 1.5 | FIG. 1 | AA |
| | 12 | 25 | 1.0 | 1.5 | 1.5 | FIG. 1 | AA |
| | 13 | 25 | 1.0 | 1.5 | 1.5 | FIG. 1 | AA |
| | 14 | 25 | 1.0 | 1.5 | 1.5 | FIG. 1 | AA |
| | 15 | 25 | 1.0 | 1.0 | 1.0 | FIG. 1 | B |
| | 16 | 25 | 1.1 | 1.0 | 0.9 | FIG. 1 | B |
| | 17 | 25 | 1.0 | 1.1 | 1.1 | FIG. 1 | AA |
| | 18 | 25 | 1.0 | 1.9 | 1.9 | FIG. 1 | AA |
| | 19 | 25 | 1.0 | 2.1 | 2.1 | FIG. 1 | A |
| | 20 | 25 | 1.0 | 2.1 | 2.1 | FIG. 1 | A |
| | 21 | 25 | 1.0 | 1.5 | 1.5 | FIG. 1 | AA |
| | 22 | 25 | 1.0 | 1.5 | 1.5 | FIG. 1 | AA |
| | 23 | 25 | 1.0 | 1.5 | 1.5 | FIG. 1 | B |
| | 24 | 25 | 1.0 | 1.5 | 1.5 | FIG. 1 | A |
| | 25 | 25 | 1.0 | 1.5 | 1.5 | FIG. 1 | B |
| | 26 | 25 | 1.0 | 1.5 | 1.5 | FIG. 1 | B |
| | 27 | 25 | 1.0 | 1.5 | 1.5 | FIG. 1 | AA |
| | 28 | 25 | 1.0 | 1.5 | 1.5 | FIG. 1 | AA |
| | 29 | 25 | 1.0 | 1.5 | 1.5 | FIG. 1 | A |
| | 30 | 20 | 1.0 | 1.5 | 1.5 | FIG. 1 | B |
| | 31 | 25 | 1.0 | 1.5 | 1.5 | FIG. 1 | AA |
| | 32 | 25 | 1.0 | 1.5 | 1.5 | FIG. 1 | A |
| | 33 | 15 | 1.0 | 1.5 | 1.5 | FIG. 1 | AA |
| | 34 | 10 | 1.0 | 1.5 | 1.5 | FIG. 1 | A |
| | 35 | 25 | 1.0 | 1.5 | 1.5 | FIG. 1 | A |
| | 36 | 25 | 1.0 | 1.5 | 1.5 | FIG. 1 | B |
| | 37 | 25 | 1.0 | 1.5 | 1.5 | FIG. 1 | B |
| | 38 | 25 | 1.0 | 1.5 | 1.5 | FIG. 1 | B |
| | 39 | 25 | 1.0 | 1.5 | 1.5 | FIG. 1 | B |
| | 40 | 25 | 1.0 | 1.5 | 1.5 | FIG. 1 | B |
| Comparative Example | 1 | 25 | 0.0 | 2.5 | — | FIG. 5 | C |
| | 2 | 25 | 2.5 | 0.0 | 0.0 | FIG. 6 | C |
| | 3 | 25 | 1.0 | 1.5 | 1.5 | FIG. 7 | C |
| | 4 | 25 | 1.0 | 1.5 | 1.5 | FIG. 1 | C |
| | 5 | 25 | 1.0 | 1.5 | 1.5 | FIG. 1 | C |
| | 6 | 25 | 1.0 | 1.5 | 1.5 | FIG. 1 | C |

Although the evaluation result of the cockling suppression of Example 24 was "AA", which was the same as that of Example 1, Example 1 was superior to Example 24. Although the evaluation result of the cockling suppression of Example 27 was "AA", which was the same as that of Example 1, Example 1 was superior to Example 27 from the viewpoints of apparatus downsizing and cost.

(Conveyability)

A solid image measuring 35 cm in the longitudinal direction of a line head by 2 cm in a sheet feeding direction was recorded on 1,000 recording media with the ink jet recording apparatus 100 having a configuration illustrated in FIG. 1 under conditions shown in Table 7. After the recording of the solid image, the following step was repeated: the sheets were each fed by 2 cm and the solid image was recorded again. Thus, a total of 13 solid images were recorded. The resultant image was such an image that a recorded portion and a non-recorded portion continued every 2 cm. Other conditions were the same as the above-mentioned conditions. In Example 41, however, no air was blown from the air knife. Accordingly, the symbol "-" was described in the column "Air pressure of air knife (Pa)" in Table 7.

Then, the presence or absence of the occurrence of each of an image shift, end bending and the jamming of each of the recording media was recognized during the recording, followed by the evaluation of printing suitability in accordance with the following evaluation criteria. When the solid image was recorded while shifting from an intended recording place by 1% or more or when the solid image was recorded while its length lengthened or shortened by 1% or more, it was judged that "the image shift occurred." In addition, when a corner of the recording medium having recorded thereon the solid image was bent at the time of the visual observation of the recording medium, it was judged that "the end bending occurred." The evaluation results are shown in the right side of Table 7.

AA: None of the image shift and the end bending occurred and hence all the images were able to be recorded.

A: Although the image shift occurred in any one of the images, the jamming of the recording medium did not occur in each of the images.
B: Although the image shift and the end bending occurred in any one of the images, the jamming of the recording medium did not occur in each of the images.

TABLE 7

Evaluation conditions and evaluation results

| | | | | Evaluation condition | | | | |
|---|---|---|---|---|---|---|---|---|
| | | | | Recording portion Temperature (° C.) | First heating unit | | | |
| | | | | | Temperature (° C.) | | System by which conveying | Air pressure |
| | | Ink | Reaction liquid | Recording medium | Recording surface | Recording surface | Rear surface | member is heated | of air knife (Pa) |
| Example | 1 | 1 | 1 | 1 | 25 | 70 | 80 | 1 | 500 |
| | 41 | 1 | 1 | 1 | 25 | 70 | 80 | 1 | — |
| | 42 | 1 | 1 | 2 | 25 | 70 | 80 | 1 | 500 |
| | 43 | 1 | 1 | 1 | 25 | 70 | 80 | 1 | 90 |
| | 44 | 1 | 1 | 1 | 25 | 70 | 80 | 1 | 100 |
| | 45 | 1 | 1 | 1 | 25 | 70 | 80 | 1 | 1,000 |
| | 46 | 1 | 1 | 1 | 25 | 70 | 80 | 1 | 1,050 |

| | | Evaluation condition | | | | | | |
|---|---|---|---|---|---|---|---|---|
| | | Second heating unit | | | | | | |
| | | Temperature of recording surface (° C.) | Fixing member | $T_1$ (sec) | $T_2$ (sec) | Value of $T_2/T_1$ (times) | Remark | Evaluation result Conveyability |
| Example | 1 | 90 | Belt | 1.0 | 1.5 | 1.5 | FIG. 1 | AA |
| | 41 | 90 | Belt | 1.0 | 1.5 | 1.5 | FIG. 1 | B |
| | 42 | 90 | Belt | 1.0 | 1.5 | 1.5 | FIG. 1 | A |
| | 43 | 90 | Belt | 1.0 | 1.5 | 1.5 | FIG. 1 | B |
| | 44 | 90 | Belt | 1.0 | 1.5 | 1.5 | FIG. 1 | AA |
| | 45 | 90 | Belt | 1.0 | 1.5 | 1.5 | FIG. 1 | AA |
| | 46 | 90 | Belt | 1.0 | 1.5 | 1.5 | FIG. 1 | B |

Although the evaluation result of the conveyability of Example 41 was "B", which was the same as the evaluation results of Examples 43 and 46, Examples 43 and 46 were superior to Example 41.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-151697, filed Sep. 22, 2022, Japanese Patent Application No. 2022-151698, filed Sep. 22, 2022, Japanese Patent Application No. 2022-151699, filed Sep. 22, 2022, and Japanese Patent Application No. 2023-142106, filed Sep. 1, 2023, which are hereby incorporated by reference herein in their entirety.

What is claimed is:

1. An ink jet recording method comprising recording an image on a recording medium with an ink jet recording apparatus comprising: a recording portion configured to apply an aqueous ink ejected by an ink jet system to the recording medium; and a blowing portion configured to blow air to the recording medium having applied thereto the aqueous ink, while conveying the recording medium, to dry the aqueous ink, wherein the blowing portion comprises conveying members configured to convey the recording medium and a blowing device configured to blow air to the recording medium, wherein the conveying members comprise a first conveying member, which is free of an adsorption mechanism configured to adsorb the recording medium, and a second conveying member, which comprises an adsorption mechanism configured to adsorb the recording medium, in the stated order, wherein the aqueous ink comprises a water-soluble organic solvent, and wherein the water-soluble organic solvent comprises a water-soluble hydrocarbon compound having a hydrocarbon chain having 3 or more carbon atoms, the compound being substituted with 2 or more hydrophilic groups each selected from the group consisting of: a hydroxy group; an amino group; and an anionic group, provided that the hydrocarbon chain may be interrupted by a sulfonyl group or an ether group and when the number of the carbon atoms of the hydrocarbon chain is 3 or 4, the hydrophilic groups comprise an anionic group or the hydrocarbon chain is interrupted by a sulfonyl group.

2. The ink jet recording method according to claim 1, wherein a time period ($T_1$ (sec)) required for the recording medium to pass a top of the first conveying member and a time period ($T_2$ (sec)) required for the recording medium to pass a top of the second conveying member satisfy relationships represented by the following formulae (1) to (3)

$$T_1 > 0 \tag{1}$$

$$T_2 > 0 \tag{2}$$

$$1.0 < T_2/T_1 \tag{3}.$$

3. The ink jet recording method according to claim 2, wherein the $T_1$ (sec) and the $T_2$ (sec) further satisfy a relationship represented by the following formula (4)

$$1.0 < T_2/T_1 < 2.0 \qquad (4).$$

4. The ink jet recording method according to claim 1, further comprising, before the application of the aqueous ink to the recording medium, a reaction liquid applying step of applying an aqueous reaction liquid, which comprises a reactant that reacts with the aqueous ink, to the recording medium.

5. The ink jet recording method according to claim 1, wherein the aqueous ink further comprises a resin particle.

6. The ink jet recording method according to claim 1,
wherein the ink jet recording apparatus further comprises, after the blowing portion, a fixing portion configured to bring a fixing member into contact with a region of the recording medium having applied thereto a liquid to heat the recording medium,
wherein the blowing portion comprises a first heating unit configured to subject a recording surface of the recording medium to non-contact heating and to cause the second conveying member, which has been heated, to adsorb a rear surface of the recording medium through suction to subject the recording medium to contact heating,
wherein the fixing portion comprises a second heating unit configured to subject the recording surface and rear surface of the recording medium to contact heating,
wherein a temperature of the rear surface of the recording medium heated by the first heating unit is higher than a temperature of the recording surface of the recording medium heated by the first heating unit, and
wherein a temperature of the recording surface of the recording medium heated by the second heating unit is higher than a glass transition temperature of the resin particle.

7. The ink jet recording method according to claim 6, wherein a unit for heating the second conveying member is a device configured to subject the recording surface of the recording medium to non-contact heating.

8. The ink jet recording method according to claim 6,
wherein the temperature of the rear surface of the recording medium heated by the first heating unit is less than 100° C.,
wherein the temperature of the recording surface of the recording medium heated by the second heating unit is less than 100° C., and
wherein a difference between a temperature of the recording surface of the recording medium at a time of the application of the aqueous ink and the temperature of the rear surface of the recording medium heated by the first heating unit is less than 80° C.

9. The ink jet recording method according to claim 6, wherein the second heating unit is a heated fixing belt.

10. The ink jet recording method according to claim 1, wherein when the water-soluble organic solvent is a hydrocarbon compound substituted with 2 hydroxy groups, the number of carbon atoms present between the 2 hydroxy groups is 5 or more.

11. The ink jet recording method according to claim 1,
wherein the blowing portion comprises a first combination, which comprises the first conveying member configured to convey the recording medium and a first blowing device configured to blow air to the recording medium, and a second combination arranged to be distant from the first combination, the second combination comprising the second conveying member configured to convey the recording medium and a second blowing device configured to blow air to the recording medium, in the stated order, and
wherein the blowing portion further comprises a third blowing device arranged between the first combination and the second combination, the third blowing device being configured to apply an air pressure to a recording surface of the recording medium.

12. The ink jet recording method according to claim 11, wherein the third blowing device applies an air pressure of 100 Pa or more to 1,000 Pa or less to the recording surface of the recording medium.

13. The ink jet recording method according to claim 1,
wherein the recording medium is flat paper, and
wherein the first conveying member has a conveying length equal to or more than a length of the flat paper.

14. The ink jet recording method according to claim 1, wherein the recording medium is a recording medium comprising cellulose.

15. The ink jet recording method according to claim 1, wherein the recording medium has a basis weight ($g/m^2$) of 120 $g/m^2$ or less.

16. An ink jet recording apparatus comprising:
a recording portion configured to apply an aqueous ink ejected by an ink jet system to a recording medium; and
a blowing portion configured to blow air to the recording medium having applied thereto the aqueous ink, while conveying the recording medium, to dry the aqueous ink,
wherein the blowing portion comprises conveying members configured to convey the recording medium and a blowing device configured to blow air to the recording medium,
wherein the conveying members comprise a first conveying member, which is free of an adsorption mechanism configured to adsorb the recording medium, and a second conveying member, which comprises an adsorption mechanism configured to adsorb the recording medium, in the stated order,
wherein the aqueous ink comprises a water-soluble organic solvent, and
wherein the water-soluble organic solvent comprises a water-soluble hydrocarbon compound having a hydrocarbon chain having 3 or more carbon atoms, the compound being substituted with 2 or more hydrophilic groups each selected from the group consisting of: a hydroxy group; an amino group; and an anionic group, provided that the hydrocarbon chain may be interrupted by a sulfonyl group or an ether group and when the number of the carbon atoms of the hydrocarbon chain is 3 or 4, the hydrophilic groups comprise an anionic group or the hydrocarbon chain is interrupted by a sulfonyl group.

* * * * *